United States Patent
Dai et al.

(10) Patent No.: US 12,210,642 B2
(45) Date of Patent: Jan. 28, 2025

(54) PERMISSION CONTROL VIA DATA REDUNDANCY IN DETERMINISTIC STREAMING SYSTEM

(71) Applicant: Groq, Inc., Mountain View, CA (US)

(72) Inventors: Zefu Dai, Toronto (CA); John Thompson, Minneapolis, MN (US)

(73) Assignee: GROQ, INC., Mountain View, CA (US)

( * ) Notice: Subject to any disclaimer, the term of this patent is extended or adjusted under 35 U.S.C. 154(b) by 296 days.

(21) Appl. No.: 17/954,262

(22) Filed: Sep. 27, 2022

(65) Prior Publication Data

US 2023/0129113 A1   Apr. 27, 2023

Related U.S. Application Data

(60) Provisional application No. 63/271,651, filed on Oct. 25, 2021.

(51) Int. Cl.
  *G06F 21/00* (2013.01)
  *G06F 21/62* (2013.01)
(52) U.S. Cl.
  CPC ............... *G06F 21/6218* (2013.01)
(58) Field of Classification Search
  CPC ....... G06F 21/6218; G06F 11/10; G06F 21/85
  See application file for complete search history.

(56) References Cited

U.S. PATENT DOCUMENTS

| | | | |
|---|---|---|---|
| 2020/0213313 A1* | 7/2020 | Yakan | G06F 3/002 |
| 2020/0285498 A1* | 9/2020 | Keeth | G06F 12/145 |
| 2021/0326218 A1* | 10/2021 | Rachapudi | G06F 11/3006 |
| 2022/0342573 A1* | 10/2022 | Cai | G06F 9/544 |
| 2023/0090508 A1* | 3/2023 | Yoo | H04L 9/0863 |
| | | | 713/186 |

OTHER PUBLICATIONS

Kappes, Giorgos, Andromachi Hatzieleftheriou, and Stergios V. Anastasiadis. "Multitenant access control for cloud-aware distributed filesystems." IEEE Transactions on Dependable and Secure Computing 16.6 (2017): 1070-1085. (Year: 2017).*

* cited by examiner

*Primary Examiner* — Ka Shan Choy
(74) *Attorney, Agent, or Firm* — Amin, Turocy & Watson, LLP

(57) ABSTRACT

Embodiments are directed to a computing system with permission control via data redundancy. The computing system includes a memory and a permission control circuit coupled to the memory. The permission control circuit encodes a first data vector by using a bit position register with a first permission control code for a first user, writes the encoded first data vector into the memory, and updates content of the bit position register from the first permission control code to a second permission control code for a second user. The encoded first data vector written into the memory is inaccessible for the second user based on the updated content of the bit position register.

20 Claims, 16 Drawing Sheets

PERMISSION CONTROL VIA DATA REDUNDANCY IN DETERMINISTIC STREAMING SYSTEM

CROSS-REFERENCE TO RELATED APPLICATIONS

This application claims a benefit and priority to U.S. Provisional Patent Application Ser. No. 63/271,651, filed on Oct. 25, 2021, entitled "Permission Control Via Data Redundancy", which is hereby incorporated by reference in its entirety.

This application incorporates by reference in its entirety U.S. patent application Ser. No. 17/203,214, filed on Mar. 16, 2021, which claims the benefit of priority to U.S. Provisional Application Ser. No. 63/114,500, filed Nov. 16, 2020, entitled "Tensor Streaming Processor Architecture".

TECHNICAL FIELD

The present disclosure generally relates to a processor architecture, and more specifically to permission control via data redundancy in a computing machine.

BACKGROUND

It is commonplace nowadays for computing resources to be shared by several tenants, e.g., in a cloud computing environment. This may cause mistrust between those tenants, for example, data security concerns or data leakage. Thus, it is important that such resources provide a means for each tenant to protect sensitive data from all others. One area of concern relates to stored data.

As more data centers deploy modern artificial intelligence (AI) chips, the risks increase. For example, modern AI chips have several MiBs (mebibytes) of an on-chip static random-access memory (SRAM) and/or GiBs (gibibytes) of a dynamic random-access memory (DRAM) and may contain residual data that must be protected. Clearing all memory by systematically writing over contents is extremely time and power intensive making it impractical to implement. This is particularly problematic for applications that require fast compute times where computing resources are not infinite. Thus, there is a need for retaining a high level of security but with significantly fewer overhead constraints.

SUMMARY

In recent years, there has been tremendous use in industry of one type of multivariate statistical analysis, commonly referred to as "machine learning" or "artificial neural networks". At the heart of such analysis techniques is linear algebra, in particular, vector-matrix multiplication. For example, an input vector numerically represents an image (e.g., of a handwritten character), and the matrix numerically encodes the trained weights of a multilevel artificial neural network. The input vector and matrix are multiplied to produce an output vector. Certain elements of the output vector can have large values, indicating that the image encoded in the input vector belongs to a certain class of images.

When the size of the input vector is large (e.g., 1024 elements) to represent in great detail (or with many characteristics) some class of data objects (e.g., images, or time series data from the futures market), the training matrix can be of the size of, e.g., 1024 by 1024 elements. Multiplying the input vector by the training matrix can require over 1 billion multiplications and additions. Training a matrix with tens of thousands of sample vectors therefore requires hundreds of trillions of multiplications and additions. Such multiplication and addition operations, when executed on a computer are manipulated in the form of floating-point operations ("FLOPs"), with a trillion FLOPS referred to as a teraflop.

This demand for performing huge numbers of vector-matrix multiplications has led to the development of computing machines that are specialized processors that perform many teraflops or even petaflops per second, to meet the real-time needs of those in industry using this statistical analysis technology. One family of such specialized processors are referred to as "streaming processors." With streaming processors, the linear algebra operations are partitioned into streams of data and/or instructions on a host processor, and then sent to the specialized processors to be acted upon as quickly as possible. For example, a vector-matrix multiply can be executed by partitioning the matrix into a set of row vectors, and then creating a stream. This entire stream is then sent to the specialized processor (or first the stream is created inside the host processor for use on the streaming processor with large amounts of internal memory), after which the streaming processor executes the necessary mathematical operations to enable the linear algebra calculations, such as the vector-matrix multiply operation.

An example of a streaming processor is a Tensor Streaming Processor (TSP), developed and manufactured by GROQ, INC. of Mountain View, California. For use in commerce, the GROQ TSP Node™ Accelerator Card is available as a x16 PCI-Express (PCIe) 2-slot expansion card that hosts a single GROQ Chip1™ device. The TSP is a streaming processor based on two key optimizations: (1) machine learning algorithms exhibit abundant data parallelism, which are directly mapped to the scalable architecture, and (2) the scalable architecture enables precise planning for and control of the architecture by compilers, thus greatly increasing performance and power efficiency. Tensor computations (typically computations on vectors and matrices) are performed using a streaming process model where computational tiles, and data storage and switching tiles, are interconnected for data transfers between tiles by a superlane structure. The superlane structure takes advantage of dataflow locality as elements of tensors flow through the architecture to be calculated upon. The TSP architecture is disclosed in more detail in U.S. patent application Ser. No. 17/203,214 which was filed Mar. 16, 2021, incorporated herein in its entirety.

One strength of streaming processors is that there are no disruptions in the processing flow, similar to a pipeline operation. The data and/or instructions flow in specified directions, and each processing sub-section of the streaming processor only needs to 1) accept data, 2) process the data, and then 3) pass the data and results to the next sub-section. Structuring the data, assembling the final results, and scheduling the data flows typically is not executed by the processing sub-sections, but handled by other sub-sections of the streaming processor or by a host computer connected to the streaming processor. The streaming processor halts execution when all of the data is processed.

Embodiments of the present disclosure are directed to, but are not limited to, a deterministic streaming system with one or more deterministic streaming processors (e.g., TSPs or artificial intelligence processors) each having a functional slice architecture. In some embodiments, each deterministic streaming processor is configured to process a machine learning (ML) model. Each deterministic streaming processor is divided into a plurality of functional units organized into a plurality of functional slices. Each functional slice is configured to perform specific functions within the deterministic streaming processor, which can include memory functional slices (MEMs) for storing operand data, arithmetic functional slices for performing operations on received operand data (e.g., vector processing, matrix manipulation), and/or the like. Functional units of the deterministic streaming processor are configured to stream operand data across a first (e.g., temporal) dimension in a direction indicated in a corresponding instruction, and receive instructions across a second (e.g., spatial) dimension. The compiler for the deterministic streaming processor is aware of the hardware configuration of the deterministic streaming processor and configures the timing of data and instruction flows such that corresponding data and instructions are intersected at each computational element at a predetermined time. Each functional slice of the deterministic streaming processor can operate on a set of data lanes in a Single Instruction Multiple Data (SIMD) manner. The set of data lanes can be referred to herein as a "superlane" and represents a cross-section of all the functional slices on a processor chip.

The TSP architecture is deterministic, and the memory accesses are therefore deterministic as well. Given the unprecedented compute density enabled by the TSP architecture, for the requisite operational intensity of the ML models, the TSP's architecture also supports unprecedented memory bandwidth. As a single core architecture, the TSP device supports an extremely high bandwidth, chip-wide data path that allows all compute elements in the chip to have access to a global memory space directly without a cache hierarchy.

The TSP is uniquely positioned to enable use of dynamic random-access memory (DRAM), magneto-resistive random-access memory (MRAM), NOR flesh memory, etc. as near-compute memory to directly compute from without a cache hierarchy. Given the simple requirements of the TSP memory access, by using DRAM as near-compute memory, the TSP architecture enables simplification of the DRAM architecture while improving bandwidth, concurrency, power and per-bit cost for DRAM over existing DRAM architectures.

The TSP has significantly higher computer density, for example, approximately seven times better compute density per transistor, and significantly improved memory bandwidth compared to the dominant commercially available graphics processing unit (GPU) incumbent. Balancing memory capacity for such large tasks with high compute density such as that of the TSP's architecture suggests the use of high-density memories such as DRAM as a preferred compute memory.

The TSP architecture being deterministic uniquely allows for use of memories such as DRAM (and even slow non-volatile memory (NVM) such as MRAM, NOR flash memory, etc.) that are much slower in random access but do enable extremely high density per device at much lower bit cost to be used as near-compute memory. This coupled with the TSP architecture's high bandwidth global data path mated with stacking technologies allows for coupling the high-density memories (like DRAM) directly to the compute units in the TSP single core. The result is an extremely high-density compute engine coupled to an extremely high density near-compute memory with an extremely high bandwidth data path enabling a device that is balanced in compute density, memory bandwidth and memory density. This allows for use of a significantly smaller number of devices for large tasks resulting in a significantly lower accessory (like host processors, storage, networking, power subsystems etc.) usage and correspondingly lower energy consumption.

Because many modern high-performance reduced instruction set computer (RISC), complex instruction set computer (CISC) and GPU architectures are not deterministic, they cannot directly use DRAM because the effective random transaction rate (RTR) is too slow (e.g., approximately 25M RTR/s corresponding to Row Cycle Time (tRC) of 40 ns)—these architectures require a cache hierarchy wherein the caches provide the RTR required. Also, because these competing architectures use a large number of cores and do not have a high bandwidth global data path like the TSP, they cannot use high bandwidth stacking techniques to access DRAM as a global addressable space. Global data path means that the switching network is substantially exclusively located on the processor die. Global addressable space means that each memory address is globally accessible to the processor independent of which bank the data is stored. Thus, the prior art RISC, CISC and GPU architectures can use only a set of banks for each core but not as global memory. Also, because the prior art DRAM RTR is too low, DRAM banks cannot be used as a local cache in the hierarchy.

Embodiments of the present disclosure are directed to a method and architecture that utilize data redundancy for error correction for completely different purposes—for permission control via data redundancy. A scheme is presented herein that leverages data redundancy, capable of detecting up to n bit errors and correcting up to m bit errors, to protect data produced and stored by one tenant from being read by any subsequent tenant. As a result, the system can apply permission control and prevent data from being read by undesired consumers.

Embodiments of the present disclosure are directed to a computing machine or computing system such as a deterministic streaming system (e.g., TSP system with one or more TSPs) with permission control via data redundancy. The computing system includes a memory and a permission control circuit coupled to the memory. The permission control circuit is configured to: encode a first data vector by using a bit position register with a first permission control code for a first user, write the encoded first data vector into the memory, and update content of the bit position register from the first permission control code to a second permission control code for a second user, wherein the encoded first data vector written into the memory is inaccessible for the second user based on the updated content of the bit position register.

Embodiments of the present disclosure are further directed to a method for writing data into a memory that is part of a computing machine or computing system such as a deterministic streaming system (e.g., TSP system with one or more TSPs). The method comprises: encoding a first data vector by using a bit position register with a first permission control code for a first user; writing the encoded first data vector into the memory; and updating content of the bit position register from the first permission control code to a second permission control code for a second user, wherein the encoded first data vector written into the memory is inaccessible for the second user based on the updated content of the bit position register.

Embodiments of the present disclosure are further directed to a method for reading data from a memory that is part of a computing machine or computing system such as a deterministic streaming system (e.g., TSP system with one or more TSPs). The method comprises: reading, from the memory, a first data vector that was encoded by using a bit position register with a first permission control code for a first user; decoding the first data vector by using the bit position register having content updated to a second permission control code for a second user; asserting an uncorrectable error flag indicating an uncorrectable error in the decoded first data vector; swapping, based on the asserted uncorrectable error flag, the decoded first data vector with a predetermined data vector; and outputting the predetermined data vector as read data indicating that the decoded first data vector is inaccessible for the second user.

Embodiments of the present disclosure are further directed to a non-transitory computer-readable storage medium comprising stored thereon executable instructions, which when executed by at least one computer processor cause the at least one computer processor to: encode a first data vector by using a bit position register with a first permission control code for a first user, write the encoded first data vector into the non-transitory computer-readable storage medium, and update content of the bit position register from the first permission control code to a second permission control code for a second user, wherein the encoded first data vector written into the non-transitory computer-readable storage medium is inaccessible for the second user based on the updated content of the bit position register.

Embodiments of the present disclosure are further directed to a non-transitory computer-readable storage medium comprising stored thereon executable instructions, which when executed by at least one computer processor cause the at least one computer processor to: reading, from the non-transitory computer-readable storage medium, a first data vector that was encoded by using a bit position register with a first permission control code for a first user; decoding the first data vector by using the bit position register having content updated to a second permission control code for a second user; asserting an uncorrectable error flag indicating an uncorrectable error in the decoded first data vector; swapping, based on the asserted uncorrectable error flag, the decoded first data vector with a predetermined data vector; and outputting the predetermined data vector as read data indicating that the decoded first data vector is inaccessible for the second user.

BRIEF DESCRIPTION OF THE DRAWINGS

Figure (FIG. 1A illustrates a transmission error path.

Figure 1A:
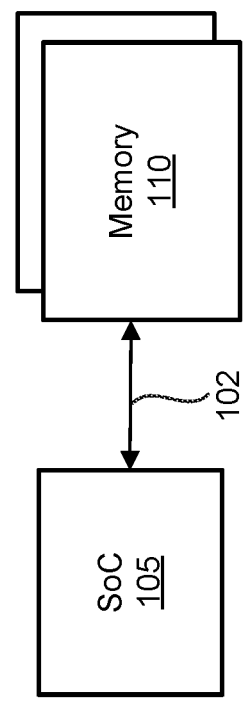
FIG. 1B illustrates error correction code (ECC)-enabled memories.

The figures depict embodiments of the present disclosure for purposes of illustration only. One skilled in the art will readily recognize from the following description that alternative embodiments of the structures and methods illustrated herein can be employed without departing from the principles, or benefits touted, of the disclosure described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that can be employed without departing from the principles of what is claimed.

Reference will now be made in detail to several embodiments, examples of which are illustrated in the accompanying figures. It is noted that wherever practicable similar or like reference numbers can be used in the figures and can indicate similar or like functionality. The figures depict embodiments of the disclosed system (or method) for purposes of illustration only. One skilled in the art will readily recognize from the following description that alternative embodiments of the structures and methods illustrated herein can be employed without departing from the principles described herein.

Error Correction Based on Data Redundancy

Continuously advancing semiconductor process technologies have enabled increased component integration, functionality, and performance in embedded systems. While the increased capabilities reap huge rewards, one of the side effects of higher performance computing systems is that more attention must be paid to the probability of soft errors. Decreasing supply voltages cause integrated circuits to be increasingly susceptible to various types of electromagnetic and particle radiation. As memory size in embedded systems grows to 100s of megabytes, soft errors due to naturally occurring alpha particles can exceed acceptable levels. As interface speeds exceed 1 Gigabits per second, excessive noise and jitter can cause errors in the transmission lines to and from external memory.

Commonly used memory bit cells retain their programmed value in the form of an electrical charge. Writing a memory bit cell consists of reprogramming and forcing the electrical charge to represent the new desired value. Memory bit cells will retain their value indefinitely, if basic requirements are met, e.g., power is applied, and—for dynamic memory types—a refresh method is active. The stored charge can be negatively impacted by injection of a charge foreign to the memory device. Cosmic particles colliding with atoms in the atmosphere cause energetic rays which can affect the stored charge. To flip the value of a memory bit cell, enough charge must be injected to change it to represent an incorrect logic value. High-energy alpha particles make up about 10 percent of cosmic rays and can penetrate many meters of concrete. Lower-energy alpha particles can be emitted by decay of materials used in the chip package, and while lower in energy, the distance these need to travel to make an impact is small. Similarly, gamma rays are highly energetic, are naturally produced by decay, and present in cosmic rays. The earth's atmosphere is a natural, significant, but not flawless barrier to cosmic particles and rays. Consequently, at higher altitude, on mountaintops or in airborne systems, the thinner atmosphere provides less protection from these particles, and so the chance of soft errors is higher. The event in which an external energy injection inadvertently modifies the value of a memory bit cell is referred to as a single event upset (SEU). The class of these errors is soft errors, as the error is not caused by a defect in the device, but instead by the device being subject to an outside disturbance. If the correct data is subsequently rewritten, it is not likely to undergo the same upset. As such, the likelihood of such an event is extremely small, while it increases with growing memory capacity.

Hard errors are categorized as incorrect functionality. This is where the error is often reproducible and persistent. While a system, including the memory contained therein, is assumed to be free of faults after production, this situation can change as the device ages. Factors such as excessive temperature variation, voltage stress, high humidity, and physical stress, all contribute to increased probability that a component in the system starts to fail. These errors can show as a stuck bit caused by a defect in a memory cell or in a printed circuit board trace.

Transmission errors are those errors that occur in the path between a memory bit cell and the functional unit that is reading or writing data. This type of error can be introduced by jitter and noise in the system temporarily exceeding design margins of the transmission path, and thus are dependent on design margins, quality of components used, and the systems susceptibility to electrical energy in its environment. Inductances, capacitances, and wire lengths of physical connections to external memory are orders of magnitude higher compared to internal wiring in the system on chip (SoC) or the memory devices. Still, transmission errors also can occur inside components. Alpha particles and gamma rays can impact sense amplifiers and memory bit lines, causing the incorrect capture of a data value.

Memory data corruption is often fatal to the operation of an embedded system. In a processor-based system, memory errors result in incorrect values in either instruction or data streams. Modern processors will detect illegal instructions, commonly forcing a reboot of the system. Errors in data streams can cause the program flow to derail, which often results in illegal access to protected memory. These events have their equivalent in the desktop world as a "blue screen of death" or a "core dump." While a crash is undesirable in embedded systems, the alternative is worse. Errors that are not immediately detected can linger in the system for an extended period of time. Undetected memory errors can multiply as the faulty data is used to calculate new data.

Once faulty data has been detected, the originating point and the subsequent induced damage can be difficult to correct or even identify. Embedded systems often operate for extended periods of time and are not frequently rebooted as one can see with desktop computers. This gives embedded systems the additional disadvantage that errors will accumulate over time. The effects of data corruption or system crashes are numerous. Misbehaving systems will annoy users and make customers unhappy. Maintenance costs can increase, as customer complaints trigger expensive investigations for error sources that are non-replicable. A sudden system failure can cause an unsafe environment around heavy machinery, and errors in secure systems can provide access via unintended backdoor entry methods.

The rates of hard errors and transmission errors are a function of many variables. Studies have measured such errors in larger systems, but those results often do not translate to other systems. On the other hand, numerous studies have published soft error rate (SER) results. As a practical example, an embedded system with 1 Gigabyte of dynamic memory is expected to have a mean time between failures (MTBF) in the range of a few times per year to once every few years. The MTBF should be considered in view of the number of systems in the field. Assuming 10,000 devices in the field with an MTBF of 10 years, this implies that an average of 1,000 devices per year is expected to suffer from a single bit soft error. The acceptability of such an error rate depends on the application domain. Developers of applications used at high altitudes will be concerned with higher SERs due to cosmic rays. Military, automotive, high-performance computing, communication, and industrial customers will be concerned with degradation of safety, security, and reliability. In the consumer domain, an MTBF of one year is sometimes acceptable. In many cases however, the added maintenance cost and the number of unhappy customers are key factors driving the need for a solution.

Because soft errors are unavoidable, methods have been developed to make systems resilient to many such errors. That is, when an error occurs, it can be detected, corrected, and the corrected value passed on, and thus the system continues uninterrupted. This feat can be accomplished by adding bits to memory data words, whereby the widened word carries sufficient information to detect and correct errors. The more bits are added to a data word, the more errors in a word can be corrected. This makes error correction a function of cost and desired reliability. A method that allows correction of a single error and detection of two errors in a word is both cost-effective and proven to provide excellent error resilience in embedded systems. This technology, widely deployed in the industry, is referred to as error correction code (ECC).

Data encoding with redundancy is often used for detecting errors in data transmitted over unreliable communication channels or stored in memory. There are many such schemes.

A parity bit, or check bit, is a bit added to a string of binary code. Parity bits are a simple form of error detecting code. Parity bits are generally applied to the smallest units of a communication protocol, typically 8-bit octets (bytes), although they can also be applied separately to an entire message string of bits. The parity bit ensures that the total number of 1-bits in the string is even or odd. Accordingly, there are two variants of parity bits: even parity bit and odd parity bit. In the case of even parity, for a given set of bits, the occurrences of bits whose value is 1 are counted. If that count is odd, the parity bit value is set to 1, making the total count of occurrences of 1's in the whole set (including the parity bit) an even number. If the count of 1's in each set of bits is already even, the parity bit's value is 0. In the case of odd parity, the coding is reversed. For a given set of bits, if the count of bits with a value of 1 is even, the parity bit value is set to 1 making the total count of 1's in the whole set (including the parity bit) an odd number. If the count of bits with a value of 1 is odd, the count is already odd, so the parity bit's value is 0. Even parity is a special case of a cyclic redundancy check (CRC), where the 1-bit CRC is generated by the polynomial (x+1). If a bit is present at a point otherwise dedicated to a parity bit but is not used for parity, it can be referred to as a mark parity bit if the parity bit is always 1, or a space parity bit if the bit is always 0. In such cases where the value of the bit is constant, it can be called a stick parity bit even though its function has nothing to do with parity. The function of such bits varies with the system design, but examples of functions for such bits include timing management or identification of a packet as being of data or address significance. If its actual bit value is irrelevant to its function, the bit amounts to a don't-care term.

The CRC is a technique used to detect errors in digital data. As a type of checksum, the CRC produces a fixed-length data set based on the build of a file or larger data set. In terms of its use, CRC is a hash function that detects accidental changes to raw computer data commonly used in digital telecommunications networks and storage devices such as hard disk drives. Cyclic redundancy checks are quite simple to implement in hardware and can be easily analyzed mathematically. CRC is one of the better techniques that is commonly used in detecting common transmission errors. CRC is based on binary division and is also called "polynomial code checksum."

Reed-Solomon codes are a group of error-correcting codes that were introduced by Irving S. Reed and Gustave Solomon in 1960. They have many applications, the most prominent of which include consumer technologies such as MiniDiscs, CDs, DVDs, Blu-ray discs, QR codes, data transmission technologies such as DSL and WiMAX, broadcast systems such as satellite communications, DVB and ATSC, and storage systems such as RAID 6. Reed-Solomon codes operate on a block of data treated as a set of finite-field elements called symbols. Reed-Solomon codes can detect and correct multiple symbol errors. By adding t=(n−k) check symbols to the data, a Reed-Solomon code can detect (but not correct) any combination of up to t erroneous symbols or locate and correct up to [t/2] erroneous symbols at unknown locations.

In coding theory, an erasure code is a forward error correction (FEC) code under the assumption of bit erasures (rather than bit errors), which transforms a message of k symbols into a longer message (code word) with n symbols such that the original message can be recovered from subset of the n symbols. The fraction r=k/n is called the code rate. The fraction k'/k, where k' denotes the number of symbols required for recovery, is called reception efficiency.

As an erasure code, the Reed-Solomon code can correct up to t erasures at locations that are known and provided to the algorithm, or the Reed-Solomon code can detect and correct combinations of errors and erasures. Reed-Solomon codes are also suitable as multiple-burst bit-error correcting codes, since a sequence of (b+1) consecutive bit errors can affect at most two symbols of size b. The choice of t is up to the designer of the code and can be selected within wide limits.

There are two basic types of Reed-Solomon codes—original view and BCH (or Bose-Chaudhuri-Hocquenghem) view—with BCH view being the most common, as BCH view decoders are faster and require less working storage than original view decoders.

BCH codes or Bose-Chaudhuri-Hocquenghem codes form a class of cyclic error-correcting codes that are constructed using polynomials over a finite field (also called Galois field). One of the key features of BCH codes is that during code design, there is a precise control over the number of symbol errors correctable by the code. It is possible to design binary BCH codes that can correct multiple bit errors. Another advantage of BCH codes is the ease with which they can be decoded, namely, via an algebraic method known as syndrome decoding. This simplifies the design of the decoder for these codes, using small low-power electronic hardware. BCH codes can be used in applications such as satellite communications, compact disc players, DVDs, disk drives, solid-state drives, quantum-resistant cryptography and two-dimensional bar codes.

In computer science and telecommunication, Hamming codes are a family of linear error-correcting codes. Hamming codes can detect one-bit and two-bit errors or correct one-bit errors without detection of uncorrected errors. By contrast, the simple parity code cannot correct errors and can detect only an odd number of bits in error. Hamming codes are perfect codes, that is, Hamming codes achieve the highest possible rate for codes with their block length and minimum distance of three. Richard W. Hamming invented Hamming codes in 1950 as a way of automatically correcting errors introduced by punched card readers. In his original paper, Hamming elaborated his general idea, but specifically focused on the Hamming (7,4) code which adds three parity bits to four bits of data. For comparison, the simple repeating the message involves one parity bit per one bit of data, so Hamming code improves this as it uses 3 parities per 4 data bits. Due to the limited redundancy that Hamming codes add to the data, they can only detect and correct errors when the error rate is low. This is the case in computer memory (usually RAM), where bit errors are extremely rare and Hamming codes are widely used, and a RAM with this correction system is an ECC RAM (or ECC memory). In this context, an extended Hamming code having one extra parity bit is often used. Extended Hamming codes achieve a Hamming distance of four, which allows the decoder to distinguish between when at most one one-bit error occurs and when any two-bit errors occur. In this sense, extended Hamming codes are single-error correcting (SEC) and double-error detecting (DED), abbreviated as SECDED.

In 1970, Hsiao proposed a new code scheme which is an optimization over Hamming code. The idea is based on constructing the parity-check matrix consisting of distinct, odd-weight column-vectors. Since the columns are distinct and non-zero, they are linearly independent thus Hamming distance 3 requirement is satisfied for SEC. Moreover, sum of any three distinct odd-weight vectors is also an odd-weight vector, which means that distance 4 requirement is also satisfied.

ECC is implemented by making the memory wider and adding a limited amount of combinatorial logic in the path to and from that extra memory. The logic required for ECC encoding is based on well-established polynomial Hamming algorithms. An ECC bit generator creates the ECC bits out of the data being stored and stores the ECC data together with the regular data. An ECC detection and correction logic function is inserted at the output of the memory. When reading the memory, this function will check the combination of ECC data and regular data. If no error is detected, it will pass the regular data through unchanged. If a single bit error is detected, it will correct the error bit and pass through the regular data, now with all bits correct, and optionally raise a flag. If two errors are detected, it will raise a flag, allowing the system to gracefully respond to the event.

Figure 1B:
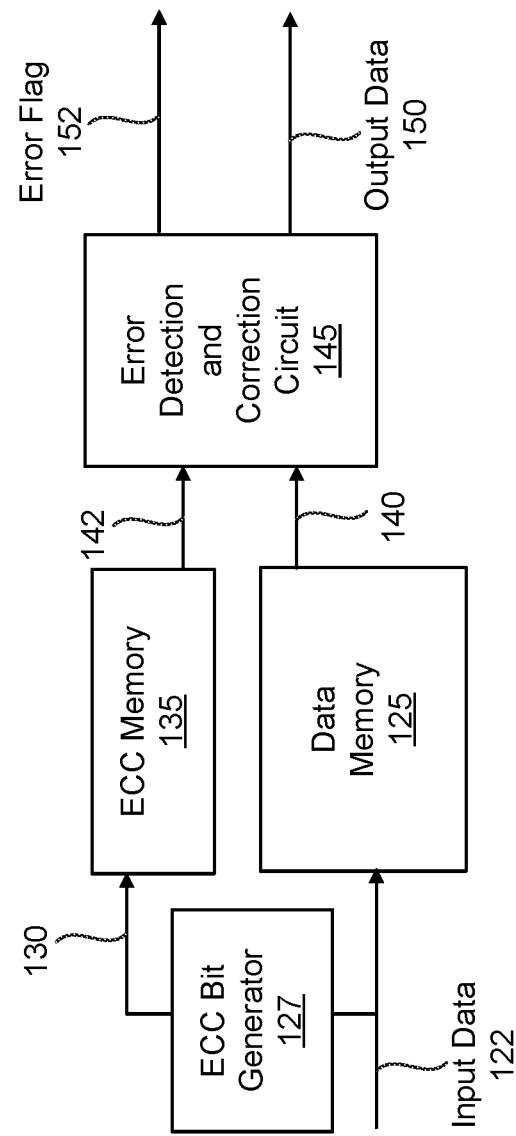

For reference, the prior art Figure (FIG. 1A illustrates an example 100 of a transmission error path 102 for a system on the chip (SoC) coupled to multiple banks of a memory 110. The prior art FIG. 1B illustrates an example 120 of an ECC-enabled memory. On each memory write, input data 122 can be stored into a data memory 125. Additionally, the input data 122 can be passed onto an ECC bit generator 127 for generating ECC bits 130 that are stored into an ECC memory 140. On each memory read, regular data 140 can be read from the data memory, and ECC data 142 can be read from the ECC memory 135. The combination of regular data 140 and ECC data 142 can be passed onto an error detection and correction circuit 145. If no error is detected by the error detection and correction circuit 145, the error detection and correction circuit 145 would pass through the regular data 140 as output data 150 without any change, and an error flag 152 would indicate no error in the output data 150. If a single bit error is detected, the error detection and correction circuit 145 can correct the error bit and pass through the regular data 140 with the corrected bit as the output data 150, and the error flag 152 would indicate no error in the output data 150. If the error detection and correction circuit 145 detects two erroneous bits in the regular data 140, the error detection and correction circuit 145 would raise the error flag 152 indicating that the output data 150 is erroneous. It can be observed from FIG. 1B that the ECC-enabled memory is wider as the ECC-enabled memory includes the ECC memory 135 in addition to the data memory 125. Also, the ECC-enabled memory has an additional logic, e.g., the ECC bit generator 127 at an input of the ECC-enabled memory and the error detection and correction circuit 145 at an output of the ECC-enabled memory.

The ability to correct a single error and detect double errors brings many benefits. While the introduction of ECC has been driven by the SER of large memories, it adds resilience against other types of errors as well. A single hard error, such as a stuck bit line inside a memory or unreliable connection on a printed circuit board (PCB), can be fully covered by ECC. Single bit transmission errors are covered as well. The key is that single bit errors in a word can be corrected. That is, ECC will correctly handle many errors in the system, if any single word shows no more than a single bit error. Another benefit is that the ECC logic can indicate a system health status. For any single bit error in a word, the ECC logic will correct the error. The ECC logic can also signal a failure status to the processor, and the operator can take measures relevant to the required reliability of that system. This method turns system degradation into a maintenance task that can be scheduled, as opposed to a response to an unexpected fatal system error condition.

Overview

Disclosed are configurations that include a deterministic streaming system with one or more deterministic streaming processors (e.g., tensor streaming processors (TSPs) or artificial intelligence processors). Each deterministic streaming processor has a functional slice architecture. In some embodiments, each deterministic streaming processor is configured to process a machine learning model. Each deterministic streaming processor can be divided into a plurality of functional units. The functional units are organized into a plurality of functional slices. Each functional slice is configured to perform specific functions within the deterministic streaming processor.

The deterministic streaming processor includes memory functional slices (MEMs) for storing operand data, arithmetic functional slices for performing operations on received operand data (e.g., vector processing, matrix manipulation), and/or the like. Functional units of the deterministic streaming processor are configured to stream operand data across a first (e.g., temporal) dimension in a direction indicated in a corresponding instruction, and receive instructions across a second (e.g., spatial) dimension. The compiler for the deterministic streaming processor is aware of the hardware configuration of the deterministic streaming processor and can configure the timing of data and instruction flows such that corresponding data and instructions are intersected at each computational element at a predetermined time. Each functional slice of the deterministic streaming processor can operate on a set of data lanes in a Single Instruction Multiple Data (SIMD) manner. The set of data lanes can be referred to herein as a "superlane" and represents a cross-section of all the functional slices on a processor chip.

The disclosed embodiments are directed to one or more deterministic streaming processors each having a functional slicing architecture. In some embodiments, each deterministic streaming processor comprises a tensor streaming processor (TSP) having a functional slicing architecture, which can be used for hardware-accelerated machine learning (ML) applications.

The deterministic streaming processor (e.g., TSP) comprises a plurality of "computational elements," each computational element corresponding to a functional unit within the deterministic streaming processor. The on-chip memory and network-on-chip (NoC) of the deterministic streaming processor architecture can be fused to provide both storage of operands and results and can act as a conduit for transferring operand and/or result data to/from the functional units of the deterministic streaming processor. The computational elements of the deterministic streaming processor can be divided between different functionalities (e.g., memory, arithmetic operation, etc.), and can be organized as functional slices which operate on multi-dimensional data (e.g., tensors). For example, each functional slice is composed from computational elements which border (or abut) each other, both horizontal and vertically, to form the functional slice. The number of computational elements and computation granularity of each computational element can be selected to take advantage of the underlying technology on which it is built. Taken together, the number of computational elements (N) and the word granularity (M) of a memory (e.g., static random-access memory (SRAM)) yields the vector length (VL) of the machine.

In some embodiments, each functional slice of the deterministic streaming processor functions independently and receives instructions from an instruction control unit (ICU). The ICU can pass instructions to a first computational element of the functional slice, which can be then propagated in a first temporal dimension of the deterministic streaming processor along the functional slice to the remaining computational elements of the functional slice. On the other hand, data operands for storage and/or processing can be passed between different functional slices of the deterministic streaming processor, in a second spatial dimension of the deterministic streaming processor perpendicular to the first temporal dimension. As such, the data flow and the instruction flow of the deterministic streaming processor are separate flows.

In some embodiments, a compiler for the deterministic streaming processor is aware of the hardware configuration of the deterministic streaming processor, and synchronizes the timing of data and instruction flows such that corresponding data and instructions are received at each computational element with a predetermined temporal relationship (e.g., during the same clock cycle, separated by a predetermined delay, etc.). In some embodiments, the predetermined temporal relationship is based upon the hardware of the deterministic streaming processor, a type of instruction, and/or the like. Because the temporal relationship between data and instructions are known by the compiler, the operand data received by a computational element does not include any metadata indicating what the data is to be used for or where the data is to be consumed. Instead, each computational element receives instructions, and based upon the predetermined timing, performs the instruction on the current data held by a register associated with the computational element. This allows for the data and instructions to flow through the deterministic streaming processor more efficiently.

Embodiments of the present disclosure are directed to a method and architecture that utilize data redundancy for error correction for permission control in a TSP or other computing systems. A scheme is presented herein that leverages data redundancy, capable of detecting up to N bit errors and correcting up to M bit errors, to protect data produced and stored by one tenant from being read by any subsequent tenant. As a result, the system can apply permission control and prevent data from being read by undesired consumers. A method and architecture are presented herein for retaining a high level of security but with much lesser overheads that is built on an already existing protection strategy based on data redundancy.

Architectural Overview of Tensor Streaming Processor

Figure 2A:
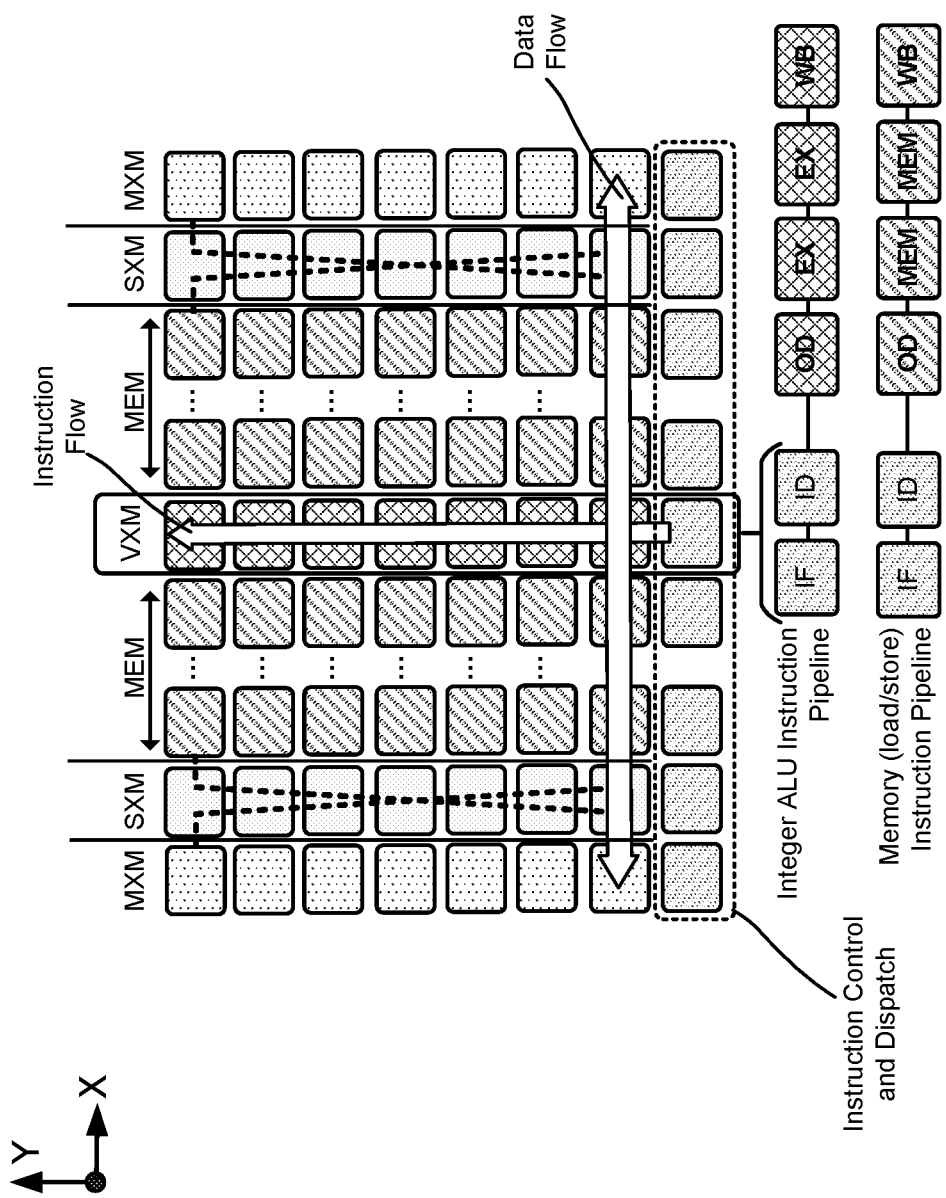
FIG. 2A illustrates an arrangement of functional slices in a tensor streaming processor (TSP), in accordance with some embodiments.

In accordance with embodiments of the present disclosure, the deterministic streaming processor plane comprises a TSP, e.g., as is commercially available from GROQ, INC. of Mountain View, California. It is to be understood that although many embodiments described herein use a TSP as the preferred deterministic streaming processors, other deterministic streaming processors can be used in commercial applications. FIG. 2A shows an arrangement of functional slices in a TSP, in accordance with some embodiments.

Certain core architectural elements set the TSP apart from GPU and accelerators. In a conventional chip multiprocessor (CMP), each "computational element" is an independent core that is interconnected using the on-chip network to exchange data between cores. Instruction execution is carried out over several stages: (i) instruction fetch (IF), (ii) instruction decode (ID), (iii) execution (EX) on Arithmetic Logic Units (ALUs), (iv) memory access (MEM), and (v) writeback (WB) to update the results in the general-purpose registers (GPRs).

In contrast from conventional multicore, where each computational element is a heterogeneous collection of functional units but globally homogeneous, the TSP inverts that to have a local functional homogeneity but chip-wide (global) heterogeneity. More specifically, the TSP reorganizes the homogeneous two-dimensional mesh of cores into the functionally sliced microarchitecture shown in FIG. 2A. In this approach, each computational element implements a specific function and is stacked vertically into a specific "functional slice" in one dimension (e.g., the Y-dimension) of the two-dimensional on-chip mesh. The TSP disaggregates the basic elements of the conventional multicore per their respective functions: instruction control and dispatch (e.g., via instruction control unit (ICU)), memory (MEM), integer (INT) arithmetic, floating point unit (FPU) arithmetic, and network (NET) interface. Each row of the two-dimensional on-chip mesh contains a cross section of all functional slices.

In this organization, each functional slice is independently controlled by a sequence of instructions specific to its on-chip role. For instance, the MEM functional slices support Read and Write but not, necessarily Add or Mul, which are typically performed in arithmetic functional slices (e.g., the vector execution module (VXM) and matrix execution module (MXM) functional slices) for some typical machine learning (ML) algorithms, such as the linear regression algorithm.

All functional slice's computational elements execute the same instruction stream—Single Instruction Multiple Data (SIMD) instructions. Thus, the common instruction decode and dispatch logic can be factored out into its own computational element (e.g., ICU) and decompose the normal instruction execution pipeline into two areas: (i) instruction fetch, decode, and parceling; and (ii) operand read, execute, and writeback. This approach decouples the memory subsystem from the functional units retrieving their operands and depositing results.

In some embodiments, each functional slice implements, e.g., a 20-stage vector pipeline that spans the computational elements of each functional slice, with each computational element producing 16 elements of the 320-element maximum vector length. This organization naturally decomposes instruction flow in the vertical dimension, and data flow in the horizontal dimension as the data flow passes over different function types. With this processor organization, instruction execution is carried out by different computational elements: instruction fetching and decoding in the ICU and operand decode, execution and writeback at each computational element of the functional slice as the (vertical flowing) dispatched instruction intersects with the (horizontal flowing) operand data on which the dispatched instruction is operating. It will be appreciated that reference to 'vertical' and 'horizontal' or 'north', 'south', 'east' and 'west' are used in connection with the illustrations shown in the Figures, are relative abstractions that are solely intended to aid the reader and should not be inferred as technical limitations.

Figure 2B:
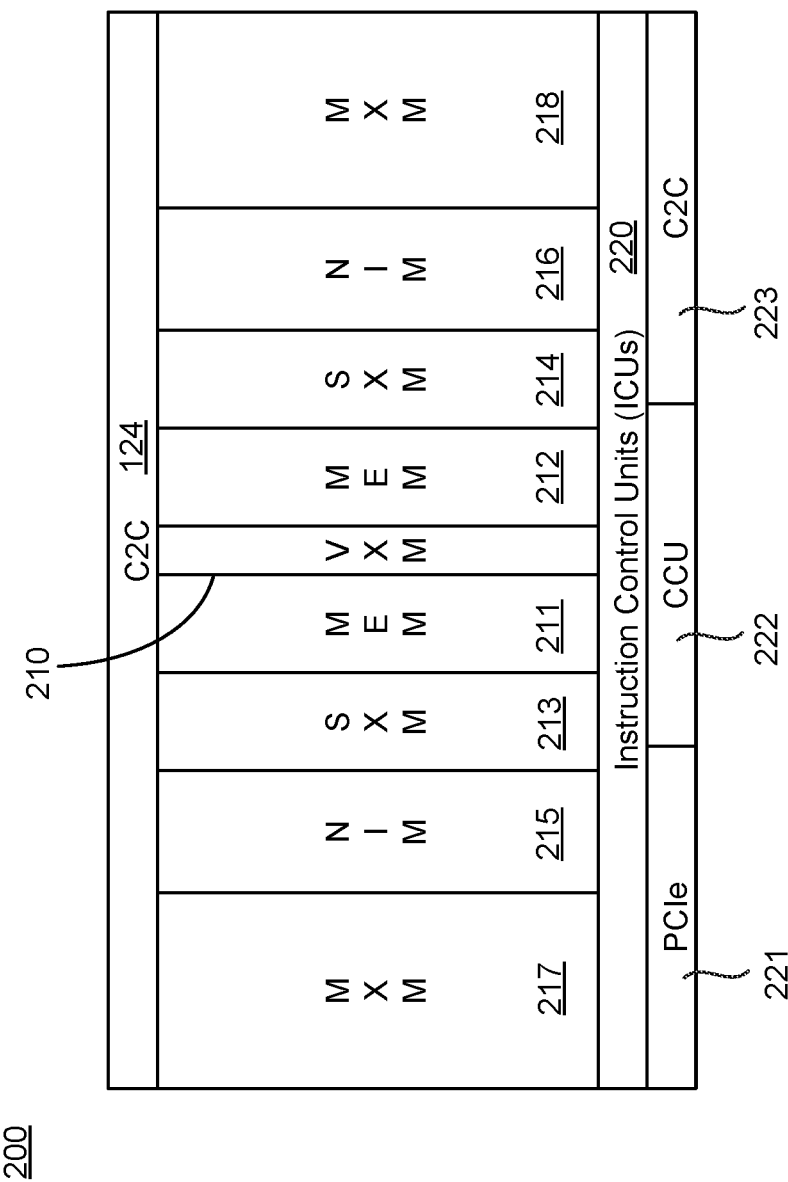
FIG. 2B illustrates an example TSP architecture, in accordance with some embodiments.

FIG. 2B illustrates an example TSP 200, in accordance with some embodiments. The TSP 200 includes memory and arithmetic units optimized for multiplying and adding input data with weight sets (e.g., trained or being trained) for machine learning applications (e.g., training or inference). For example, the TSP 200 includes a VXM 210 for performing operations on vectors (i.e., one-dimensional arrays of values). Other elements of the system are arranged symmetrically on either side of the VXM 210 to optimize processing speed. For example, the VXM 210 is adjacent to MEMS 211-212 and SXMs 213-214 to control routing of data, data domain and presentation controllers (or numerical interpretation modules (NIMs)) 215-216, and MXMs 217-218. An ICU 220 controls the flow of data and execution of operations across blocks 210-218, for example. The TSP 200 can further include communications circuits such as chip-to-chip (C2C) circuits 223-224 and an external communication circuit (e.g., PCIe) 221. The TSP 200 can, for example, further include a chip control unit (CCU) 222 to control boot operations, clock resets, and other low level setup operations.

Figure 2C:
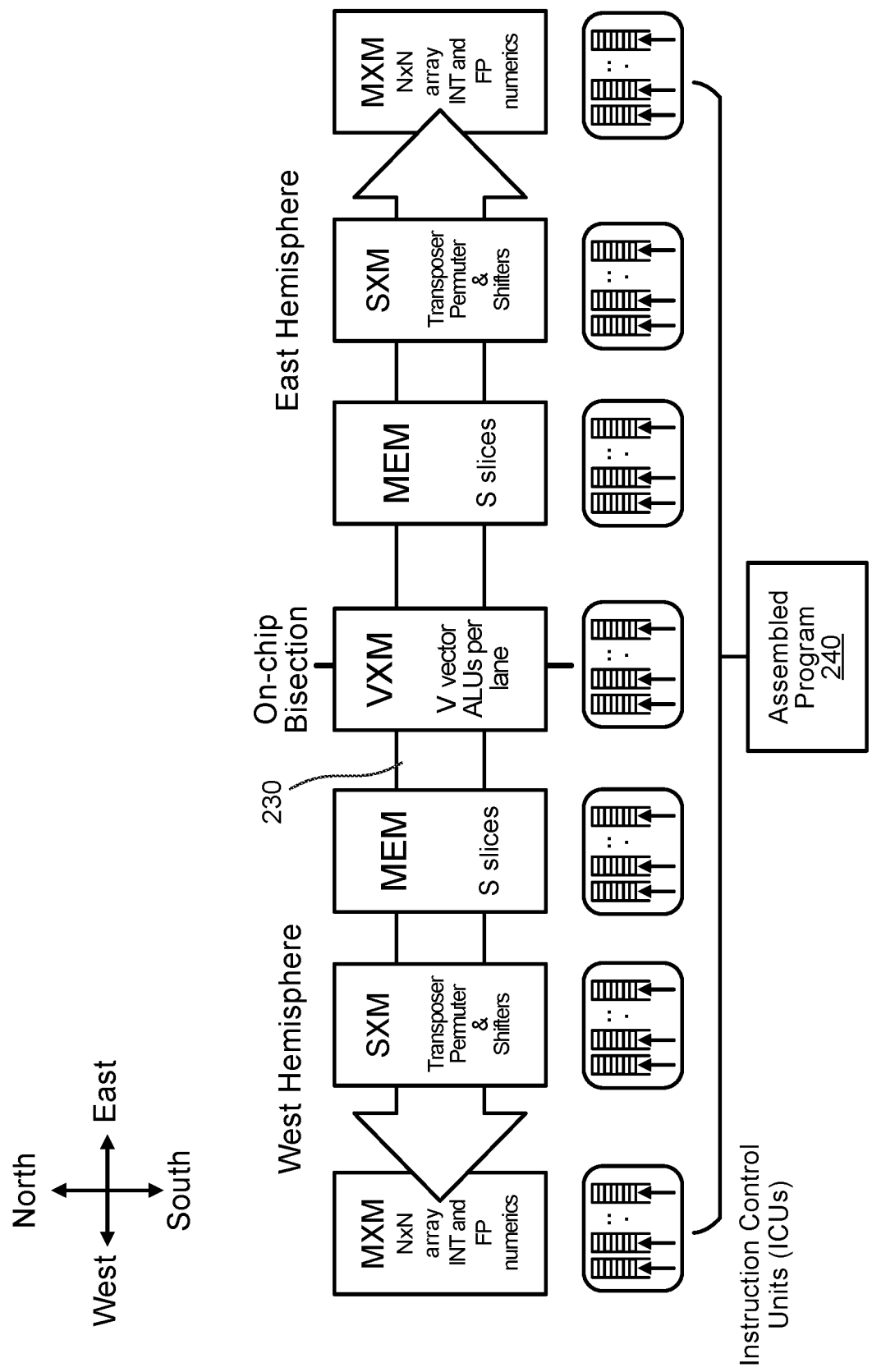
FIG. 2C illustrates organization and data flow within a row of a TSP, in accordance with some embodiments.

FIG. 2C illustrates organization and data flow within a row of the TSP 200, in accordance with some embodiments. As shown in FIG. 2C, each row of the two-dimensional on-chip mesh of the TSP 200 contains a cross section of all functional slices, e.g., N×N array of MXMs (e.g., N=320) configured for both integer (INT) and floating-point (FP) numerics (e.g., INT8 and FP16), S MEM functional slices (e.g., S=44), VXM functional slices with V vector ALUs per lane (e.g., V=16), and SXM functional slices. In this organization, each functional slice is independently controlled by a sequence of instructions specific to its on-chip role fetched by a corresponding array of ICUs (e.g., a total of I=144 ICUs). Conceptually, the functional slices are fixed and data 230 is flowing across their computational elements. As the data flows through a specific functional slice, each functional slice can optionally intercept the data operands and compute a result (e.g., in case of MXM and VXM), or move data between data transport lanes on the network (e.g., in case of SXM and MEM). Instructions flow northward from the ICUs to the functional slices, while data (operands and results) primarily flow east and west between functional slices. Any inter-lane data movement within a vector uses the on-chip network functional slice.

It is noted that the "east-west-north-south" directionality is provided herein for ease of discussion and relativity. Furthermore, the "east-west-north-south" directionality is used as a reference for explanation of processing flow as described herein and is not intended to be limited with respect to a label of a particular direction. For example, the north-south direction (i.e., direction along the vertical or Y-dimension) could be reoriented to the east-west direction (i.e., direction along the horizontal or X-dimension) and the principles currently described with east-west directionality could apply to the reoriented north-south directionality. In another example of the directionality not intended to be limited to the description per the reference noted, directionality could be referenced such that north-south is up-down and east west is right-left and the principles would accordingly apply.

In one embodiment, 320 lanes are overlaid on the TSP 100 where each computational element in the on-chip mesh operates on, e.g., 16-lanes in a SIMD manner. The 16-lane unit can be referred to herein as a "superlane" and represents a cross-section of all the functional slices on the chip. As such, a superlane represents the architecture's minimum vector length (minVL) of, e.g., 16 elements. Likewise, in one embodiment, the vertical composition of 20 tiles forming a functional slice produces a maximum vector length (maxVL) of, e.g., 20×16=320 functional units. Each of the 144 independent on-chip ICUs can issue one or more instructions per clock cycle. The compiler has the explicit control of a program order in each instruction queue, e.g., by generating an assembled program 240 for execution by the ICUs and functional slices. There can be, e.g., 64 logical streams per lane for moving operands or results on-chip with 32 streams eastward and 32 streams westward. The 220 MB of globally shared SRAM delivers 32 bytes per lane of stream bandwidth and low-latency access to model parameters. For example, MEM can read and MXM can install more than e.g., 100,000 weights into a 320×320 array (i.e., 320 lanes×320 functional units) in less than 30 clock cycles including SRAM and on-chip network transit delays.

As shown in FIG. 2B and FIG. 2C, the on-chip network can be implemented as X-dim mesh and Y-dim mesh of computational elements with X-Y-X dimension order routing. Each instruction specifies the first hop direction (east or west), so memory instruction semantics have both an address and a dataflow direction. Streams are routed in the X-dimension through MEM 211/212 and routed in the Y-dimension using the SXM's 213/214 permuter and lane-shifters to move data elements vertically. The SXM's 213/214 permuter implements a permutation function that is a mathematical technique that determines the number of possible arrangements in a set when the order of the arrangements matters. Common mathematical problems involve choosing only several items from a set of items with a certain order.

The MEM 211/212 and the SXM 213/214 provide deterministic routing of stream data as the stream data flows in the X and Y dimensions, respectively. With the TSP architecture 200, functional slices interact with streams of data in a producer-consumer fashion. That is, the functional slices consume operands from streams and produce results onto a (possibly different) stream, like an assembly line operator (functional slice) and conveyor belt (stream).

Conceptually, the functional slices can be fixed and data can flow across computational elements as shown in FIG. 2C. As the data flows through the functional slice, each computational element can optionally intercept the data operands and compute a result (if the computational element comprises an arithmetic logic unit (ALU)) or move data between lanes on the network if the computational element comprises a switching element.

Streams provide a programming abstraction and are a conduit through which data flows between functional slices. Unlike GPRs, the functional slices operate on streams of parallel data flowing east or west (horizontally) across the chip. The horizontally flowing streams carrying operands intercept the vertically (northward) flowing instructions (see FIG. 2C) to perform a computation at a computational element on a functional slice. A compiler accurately maintains the chip's architectural state and uses that knowledge to ensure that instructions correctly intercept its stream operand(s).

Streams can be implemented in hardware by a chip-wide streaming register file. Streams are architecturally visible and transport operands and results between functional slices. A common software pattern involves reading operand data from one or more MEM functional slices that is then subsequently consumed and operated on by a downstream arithmetic functional slice. The results of the operation are then produced onto another stream such that they can be written back to memory or passed to subsequent computational elements. For example, a Z=X+Y operation requires four instructions: Read S1, X and Read S2, Y are executed on two MEM functional slices and directed inward toward an ALU functional slice to perform the Add S1, S2, S3. Lastly, the result can be stored back to memory via a Write S3, Z. The streams represent a collection of N-elements, operated upon in a SIMD manner by each functional slice.

By way of example, a TSP architecture makes several deliberate tradeoffs on the hardware-software interface, pushing the complexities associated with scheduling into the compiler. Specifically, it falls on the compiler to precisely schedule instructions to use the hardware correctly and efficiently. At times this involves selecting one of several means by which an algorithm or meta-operation can be realized on the hardware. Removing the control complexity of dynamic instruction scheduling for multi-issue execution units allows the ICU to be relatively small, accounting for, e.g., less than 3% of the chip area.

Figure 4:
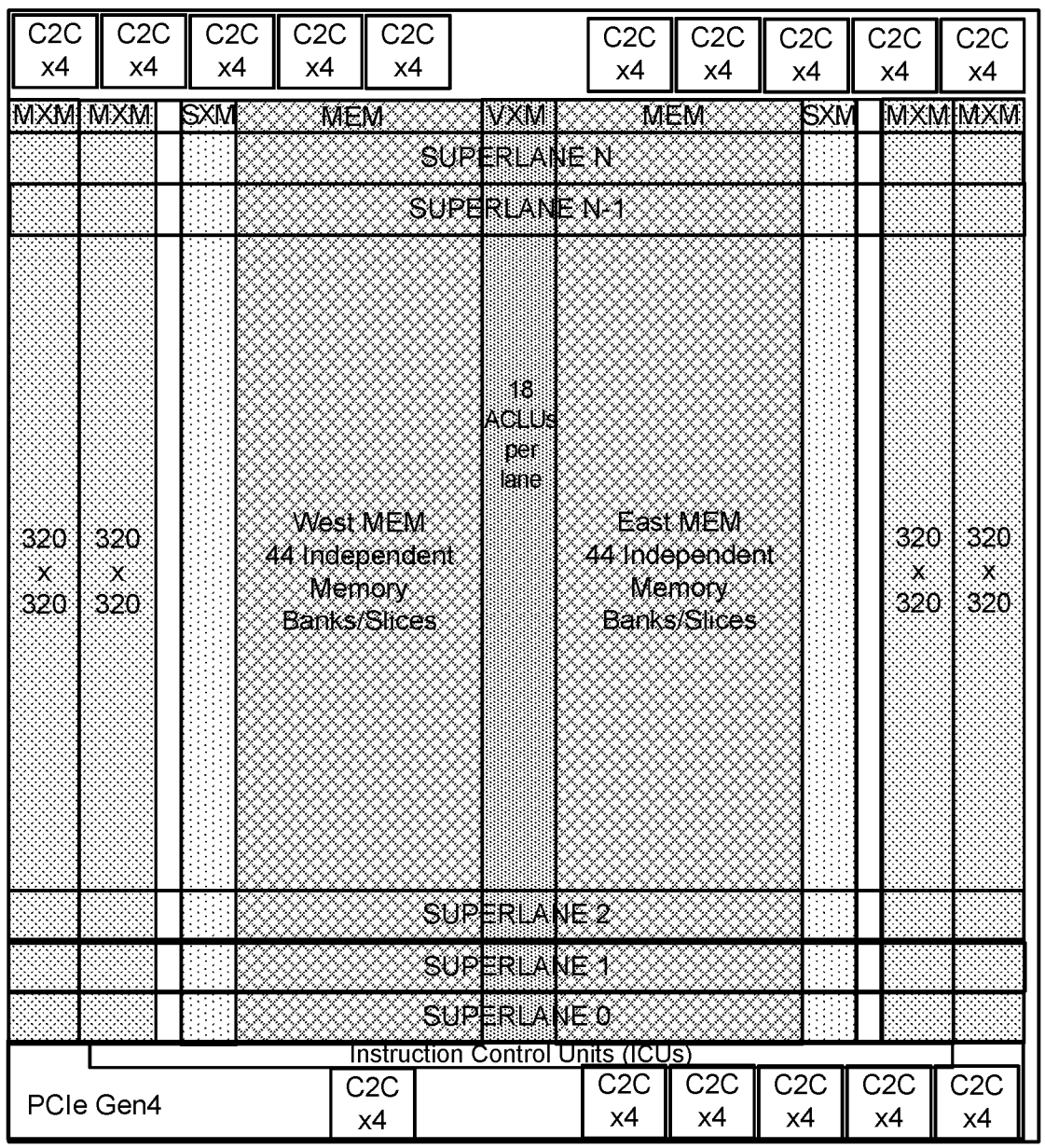
FIG. 4 illustrates a die photo of an ASIC implementation of a TSP, in accordance with some embodiments.
Figure 4:
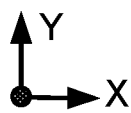

The compiler has access to, e.g., 320-lane programming abstraction overlaid on a TSP architecture (e.g., the TSP 200 in FIG. 2B or a TSP die 400 in FIG. 4) where each computational element in the on-chip mesh operates on 16-lanes in a SIMD manner. The 16-lane unit can be referred to as a "superlane" which is a cross-section of all the functional slices on the chip and the minimum granularity of computation. As such, a superlane represents the architecture's minimum vector length, minVL, of 16 elements. Likewise, the vertical composition of 20 tiles to form a functional slice (see the TSP die 400 in FIG. 4) produces a maximum vector length, maxVL, of, e.g., 20×16=320 elements.

The compiler has access to, e.g., 144 independent instruction queues (i.e., ICUs) on-chip: (a) six for westward MXM including two independent two-dimensional MAC (multiply-accumulate) arrays; (b) 14 for westward SXM for intra-superlane and inter-lane switching by rearranging elements of vectors; (c) 44 for westward MEM including 44 parallel functional slices of static random-access memory (SRAM); (d) 16 for VXM including 16 vector ALUs per lane; (e) 44 for eastward MEM—including 44 parallel functional slices of SRAM; (f) 14 for eastward SXM; and (g) six for eastward MXM including two independent two-dimensional MAC arrays, whereas each instruction queue can issue one or more instructions per cycle and the compiler has explicit control of the program order in each instruction queue.

Figure 3:
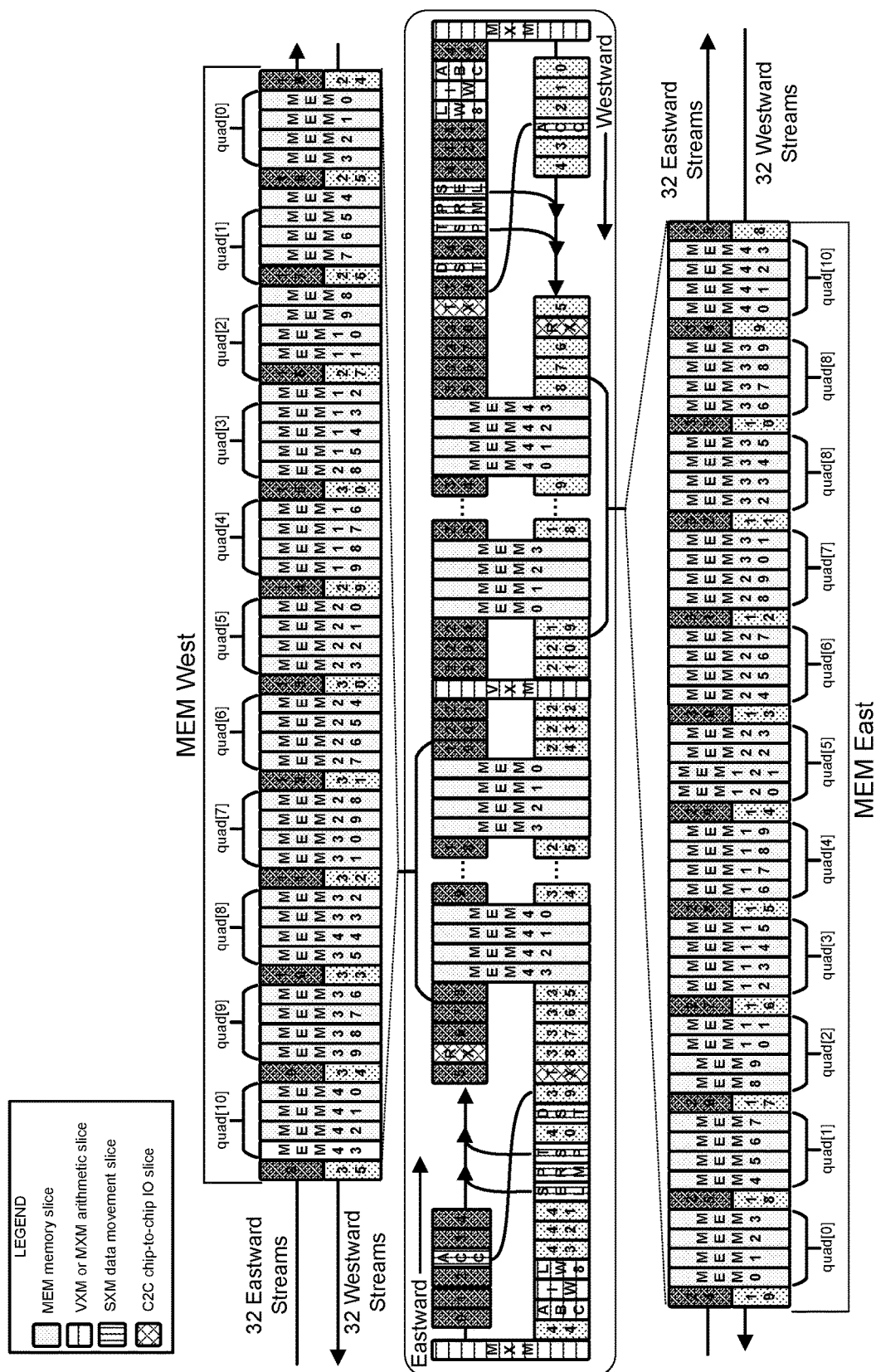
FIG. 3 depicts stream registers of a TSP that are numbered to show their locations between functional slices within a superlane, in accordance with some embodiments.

The compiler has access to, e.g., 64 logical streams per lane. For example, 32 logical streams are required to operate on 16 minVL per lane for moving operands or results on-chip with 32 streams eastward, and 32 streams westward, as shown in FIG. 3.

The compiler has access to, e.g., 220 MBytes of globally shared SRAM, in one embodiment, that delivers 32 bytes per lane of stream bandwidth and low-latency access to model parameters. For example, MEM can read and MXM can install 400K weights into all four 320×320 arrays in less than 40 operational cycles including SRAM and on-chip network transit delay.

Streams can be designated by both an identifier (0, . . . , 31) and direction. For example, in (28) designates stream 28 inward, and out (24) designates stream 24 toward the outward edge of the chip. The direction of a stream can be designated as inward (toward the chip bisection) or outward (toward the outward edge of the chip), or the direction can be designated as eastward or westward, as shown in FIG. 2C and FIG. 3.

The components of a superlane can be organized spatially as shown in FIG. 2C. The instruction set architecture (ISA) of the TSP defines instructions spanning different functional areas. The partitioned global address space (PGAS) presented by the MEM functional slices provides memory semantics for vectors to be addressed from SRAM and loaded into an architecturally visible stream with a direction of dataflow toward the functional slice intending to operate on them.

The first functional area (i.e., ICU) provides explicit instruction fetching with IFetch instruction(s), and inter-slice synchronization using Sync and Notify instructions to perform chip-wide barrier synchronization among participating functional slices. A repeated-NOP (no-op) instruction allows for precise cycle-by-cycle control of inter-instruction delay. For example, the compiler has cycle-accurate control when scheduling two operations A and B using an intervening NOP so that N cycles separate them, e.g., OpA NOP(N) OpB.

The second functional area (i.e., VXM) consists of, e.g., a 4×4 mesh of ALUs in each lane for pointwise arithmetic operations.

The third functional area (i.e., MXM) consists of, e.g., four independent two-dimensional MAC arrays that operate on INT8, FP16 or FP32 data types.

On-chip data movement uses the fourth functional area (i.e., SXM) for intra-superlane and inter-lane switching by rearranging elements of vectors. The SXM is analogous to the NET interface to communicate between cores in FIG. 2A. Together the MEM and SXM work in tandem to form the X-Y dimensional movement of data across the on-chip network.

The fifth functional area (i.e., the east and west hemisphere of on-chip MEM module) is composed of, e.g., 44 parallel MEM functional slices of SRAM and can provide the memory access concurrency necessary to fully utilize the 32 streams in each East or West direction. Each functional slice provides 13-bits of physical addressing of 16-byte memory words, and each byte maps to a lane for a total of, e.g., 220 MBytes of on-chip SRAM.

An additional sixth functional area includes C2C modules configured to provide Send and Receive primitives for exchanging 320-byte vectors between a pair of TSP chips. One possible TSP implementation (e.g., the TSP die 400) has, e.g., a total of 16×4 links operating at 30 Gbps each for a total off-chip bandwidth of 16×4×30 Gbps×2 directions=3.84 Tb/s (Tera-bytes per second) of off-chip pin bandwidth that can be flexibly partitioned to support high-radix interconnection networks of TSPs for large-scale systems. The host interface for peripheral component interconnect express (PCIe) Gen4 can be also handled in this module. The host interface can provide a lightweight direct memory access (DMA) engine to emplace a model onto the TSP memory and provide an entry point for bootstrapping the model execution. The host interface can also provide a general mechanism for passing interrupts to the host, which is necessary in the event a multi-bit memory error is observed, for example.

Table I provides a summary of example instructions for each functional slice, in accordance with some embodiments.

TABLE I

SUMMARY OF INSTRUCTIONS FOR EACH FUNCTIONAL SLICE

| | Instruction | Description |
| --- | --- | --- |
| ICU | NOP N | No-operation, can be repeated N times to delay by N cycles |
| | Ifetch | Fetch instructions from streams or local memory |
| | Sync | Parks at the head of the instruction dispatch queue to await barrier notification |
| | Notify | Releases the pending barrier operations causing instruction flow to resume |
| | Config | Configure low-power mode |
| | Repeat n, d | Repeat the previous instruction n times, with d cycles between iterations |

TABLE I-continued

SUMMARY OF INSTRUCTIONS FOR EACH FUNCTIONAL SLICE

| | Instruction | Description |
|---|---|---|
| MEM | Read a, s | Load vector at address a onto stream s |
| | Write a, s | Store stream s register contents into main memory address a |
| | Gather s, map | Indirectly read addresses pointed to by map putting onto stream s |
| | Scatter s, map | Indirectly store stream s into address in the map stream |
| VXM | unary operation | $z = op\ x$ pointwise operation on 1 operand, x, producing 1 result, z (e.g., mask, negate) |
| | binary operationtype | $z = x\ op\ y$ pointwise operations with 2 operands x and y producing 1 result, z (e.g., add, mul, sub) |
| | conversions | Converting fixed point to floating point, and vice versa |
| | ReLU | Rectified linear unit activation function max(0, x) |
| | TanH | Hyperbolic tangent - activation function |
| | Exp | Exponentiation $e^x$ |
| | RSqrt | Reciprocal square root |
| MXM | LW | Load weights (LW) from streams to weight buffer |
| | IW | Install weights (IW) from streams or LW buffer into the 320 × 320 array |
| | ABC | Activation buffer control (ABC) to initiate and coordinate arriving activations |
| | ACC | Accumulate (ACC) either INT32 or FP32 result from MXM |
| SXM | Shift up/down N | Lane-shift streams up/down by N lanes, and Selectbetween North/South shifted vectors |
| | Permute map | Bijective permute 320 inputs $\xrightarrow{map}$ outputs |
| | Distribute map | Rearrange or replicate data within a superlane (16 lanes) |
| | Rotate stream | Rotate n × n input data to generate $n^2$ output streams with all possible rotations (n = 3 or n = 4) |
| | Transpose sg16 | Transpose 16 × 16 elements producing 16 output streams with rows and columns interchanged |
| C2C | Deskew | Manage skew across plesiochronous links |
| | Send | Send a 320-byte vector |
| | Receive | Receive a 320-byte vector, emplacing it in main memory |

A sequence of instructions performed on different functional slices can be chained to create more complex actions without the need to write back intermediate results to memory. This can allow efficient processing of streams at full bandwidth and lowest latency.

Machine learning algorithms typically operate on vectors with coefficients of a specified data type (e.g., INT8, FP16, etc.). These vectors can be interpreted as an abstraction over the underlying data, whose elements can be processed by the same operation in a SIMD manner. The TSP operates on vectors that can be organized into rank-2 tensors, and relies on the graph-lowering compiler to transform higher rank tensors into rank-2 tensors.

The TSP's programming model can represent a producer-consumer model where each functional slice acts as a consumer and a producer of one or more streams. When a vector is read from a main memory, the vector can be given a stream identifier (0, . . . , 31) and direction: eastward, or westward. Once the vector is read into a stream register, the vector becomes a stream and can "flow" in the given direction in the following sense: given spatially adjacent functional slices at coordinates $x_0$, $x_1$, $x_2$ (where the spatial coordinate increases in the direction of flow), then at a given time the vector representing stream $s_1$ at functional slice $x_1$ can be accessed as operands by that functional slice. Similarly, the functional slices at $x_0$ and $x_2$ would have access to different stream values for the same stream register. In the following cycle the value $s_1$ either propagates to the functional slice at $x_2$, or else the value $s_1$ is overwritten with a result $r_1$ produced by the functional slice at $x_1$ at cycle t.

Similarly, the stream value $s_0$ that was present to be consumed by the functional slice at coordinate $x_0$ at time $t_1$ would be (absent $x_0$ overwriting the value at time $t_i$) available in the next cycle $t_{i+1}$ to the functional slice at $x_1$. Stream operands can be steered toward the functional slice that is consuming the stream operands and producing a result stream. Streams flow constantly across the chip, serving as how functional slices communicate with one another. FIG. 3 provides a graphical depiction of the interleaving of functional units and stream registers that combine to support this programming model.

In the TSP programming model, an instruction can be issued on a functional slice at a given compiler-scheduled time t and execute as a SIMD operation on stream-supplied operand vectors (e.g., of up to 320-elements), producing vectors of the same length on result streams. For example, at the micro-architectural level, the 320-element SIMD instruction can be pipelined across the vertical stack of computational elements in the functional slice. That is, at the scheduled time t, the instruction would be issued to the bottom-most computational element of the functional slice, e.g., corresponding to the first 16-element superlane of operand/result vectors. In the subsequent operational cycle, the instruction would be propagated to the next computational element northward in the functional slice, which in turn executes the instruction on the next 16-element super lane of operand vectors. This process can continue cycle-by-cycle until the process has traversed, e.g., all 20 computational elements in the functional slice. The combination of vertical instruction pipelining described above, along with the need for operands and instructions to coincide at a precise time, can result in a spatial "stagger" of SIMD operand and result data.

An on-chip deterministic memory can be implemented as a SRAM with multiple MEM slices. The on-chip deterministic memory (MEM) supplies operands for each functional slice by reading an address from a MEM slice, denoted $MEM_i$. MEM can be partitioned into two hemispheres (e.g., West MEM and East MEM, as shown for the TSP die 400 in FIG. 4), each having, e.g., 44 MEM slices numbered 0 to 43. Slice $MEM_0$ is the closest to the VXM and slice $MEM_{43}$ is the nearest to the SXM. Each MEM slice comprises, e.g., 20 tiles, arranged in a vertical stack, yielding a 2.5 Mebibyte (Mibyte) per-slice capacity, or 220 MiBytes for all 88 slices on-chip, thus providing the memory concurrency to supply 32 operands per lane, every cycle.

The MEM slices of the on-chip deterministic memory can be partitioned into 16-byte words, each word can spread across a superlane, and each byte of each word can occupy a lane of an input channel or an output feature. That is, byte 0 can be lane0, byte 1 can be lane1, etc. Each tile produces a portion of the vector, which is concatenated with the 16 elements from the adjacent tile beneath. Instructions execute in a cycle-by-cycle staggered manner across all 20 tiles in the slice: instructions flow northward over the span of 20 cycles visiting each tile in the slice.

The MEM slices of the on-chip deterministic memory provide the programming abstraction of a partitioned global shared address space with the address space laid out uniformly across the 88 slices. Each MEM slice contains pseudo-dual-port SRAMs that can service a pair of read and write requests simultaneously when the read and write requests are not targeting the same bank of the on-chip deterministic memory. As such, the bank bit is exposed so that the compiler can manage the underlying SRAM efficiently and appropriately. This can allow the compiler to take advantage of all 88 slices in 176-way memory concurrency—88 slices each with two banks—to read operands to or store results from streams.

To maximize stream concurrency, the compiler allocates memory for tensor's concurrent stream operands into separate MEM slices—as streams propagate through the MEM slices, the streams "pick up" operands from the MEM slices enroute to the MXM. This fine-grain memory management requires that the various levels of memory concurrency are exposed in the ISA allowing the compiler to explicitly schedule individual banks in each MEM slice. In an embodiment, operands are simultaneously read from one bank and results are written to the other bank in the same MEM slice.

Conventional CPUs rely on a memory hierarchy to implicitly move data between caches to service load/store operations. Cache hierarchies introduce a reactive agent in the data path that causes the undesired unpredictability, or non-determinism, in the data path to provide the illusion of sequentially consistent memory transactions within the memory hierarchy. Unlike a conventional CPU, the on-chip deterministic memory provides a thin layer of memory management that can be used to identify memory concurrency on an operation-by-operation basis.

Permission Control Via Data Redundancy

Embodiments of the present disclosure are directed to a method and architecture for memory access using permission control via data redundancy.

Figure 5:
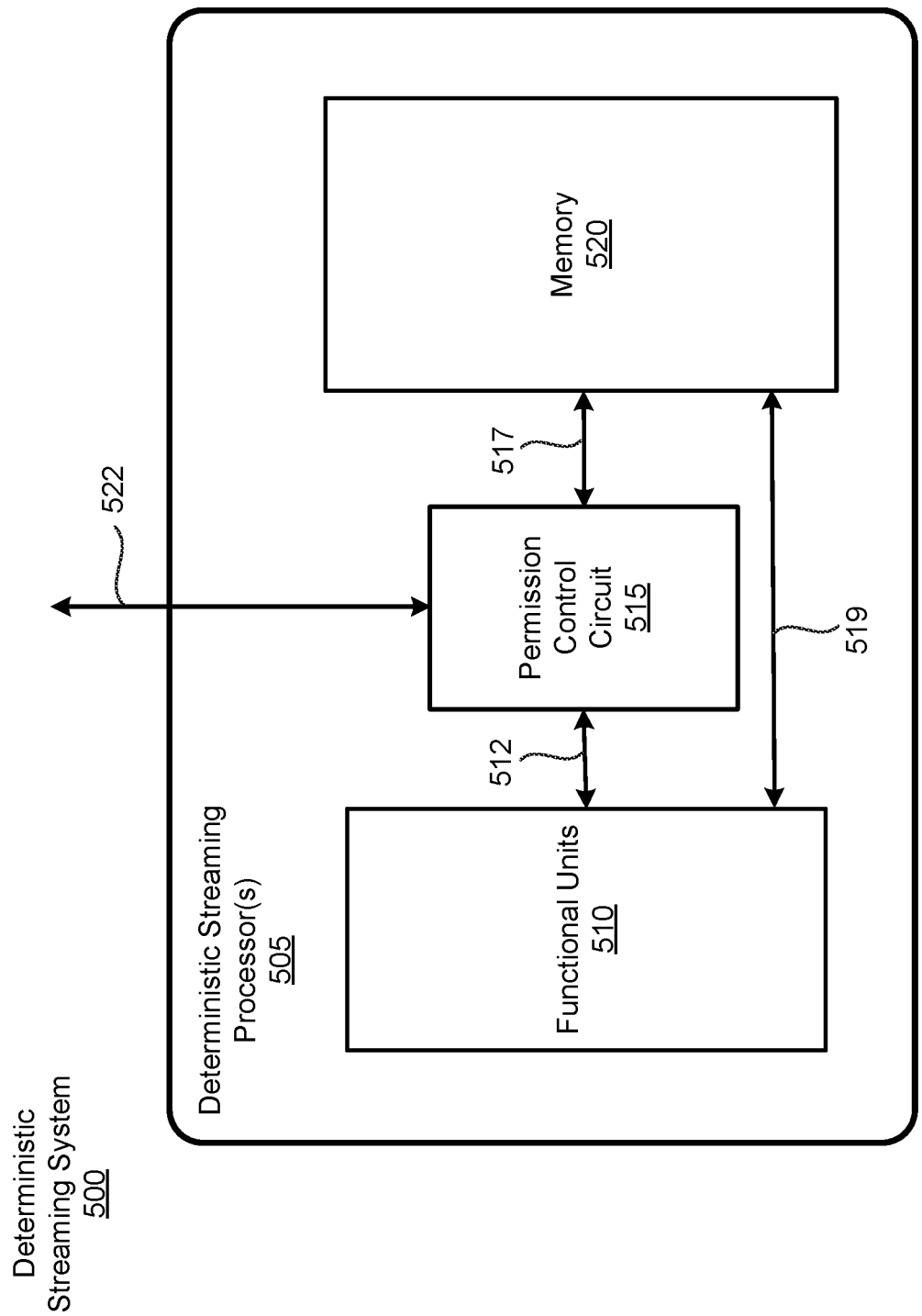
FIG. 5 illustrates an example deterministic streaming system with memory access using permission control via data redundancy, in accordance with some embodiments.

FIG. 5 illustrates an example of a computing system that is, in this embodiment, a deterministic streaming system 500 (e.g., TSP system) with memory access using permission control via data redundancy, in accordance with some embodiments. The deterministic streaming system 500 includes one or more deterministic streaming processors 505 (e.g., one or more TSP chips) with functional units 510, a permission control circuit 515, and a memory 520 (i.e., non-transitory computer-readable storage medium). The functional units 510 can be part of a single deterministic streaming processor 505 (e.g., single TSP chip). Alternatively, the functional units 510 are integrated over multiple deterministic streaming processors 505 (e.g., multiple TSP chips in a node). As aforementioned, the functional units 510 may be organized into a plurality of functional slices, and each functional slice can be configured to perform specific functions within the deterministic streaming processor 505. The functional units 510 may be arithmetic functional units (e.g., for vector processing, matrix processing, etc.), instruction control units, network interface units, data routing units, and/or the like.

The memory 520 may be e.g., a static random access memory (SRAM) or a dynamic random access memory (DRAM). The memory 520 may be part of a single deterministic streaming processor 505 (e.g., single TSP chip). Alternatively, the memory 520 encompasses multiple SRAMs or DRAMs spread over multiple deterministic streaming processors 505 (e.g., multiple TSP chips in the node). In one or more embodiments, the memory 520 represents a storage space of a data center that includes multiple racks of TSP chips.

The permission control circuit 515 performs permission control via data redundancy for accessing (e.g., reading from and/or writing to) the memory 520 so that only a user (or tenant) that wrote data into the memory 520 may have the permission to read the same data from the memory 520. In one embodiment, there is a single permission control circuit 515 within the deterministic streaming system 500 that can be shared among multiple deterministic streaming processors 505. In another embodiment, there is one permission control circuit 515 for each deterministic streaming processor 505. In some embodiments, the permission control circuit 515 is a component separate from the one or more deterministic streaming processors 505.

The permission control circuit 515 may function as an interface for accessing the memory 520. The permission control circuit 515 may be coupled to the memory 520 via an interface connection 517 through which data can be written to and/or read from the memory 520, e.g., based on a request from a user/tenant of the memory 520. In some embodiments, the request from the user for accessing the memory 520 may be provided to the permission control circuit via an interface connection 522. The functional units 510 may be directly coupled to the memory 520 via an interface connection 519. Additionally, the functional units 510 can be coupled to the permission control circuit 515 via an interface connection 512 for accessing the memory 520 via the permission control circuit 515 (e.g., based on a request from a user/tenant of the memory 520). Additional details about a structure and operation of the permission control circuit 515 are provided below in relation to FIGS. 6A through 7B.

Figure 6A:
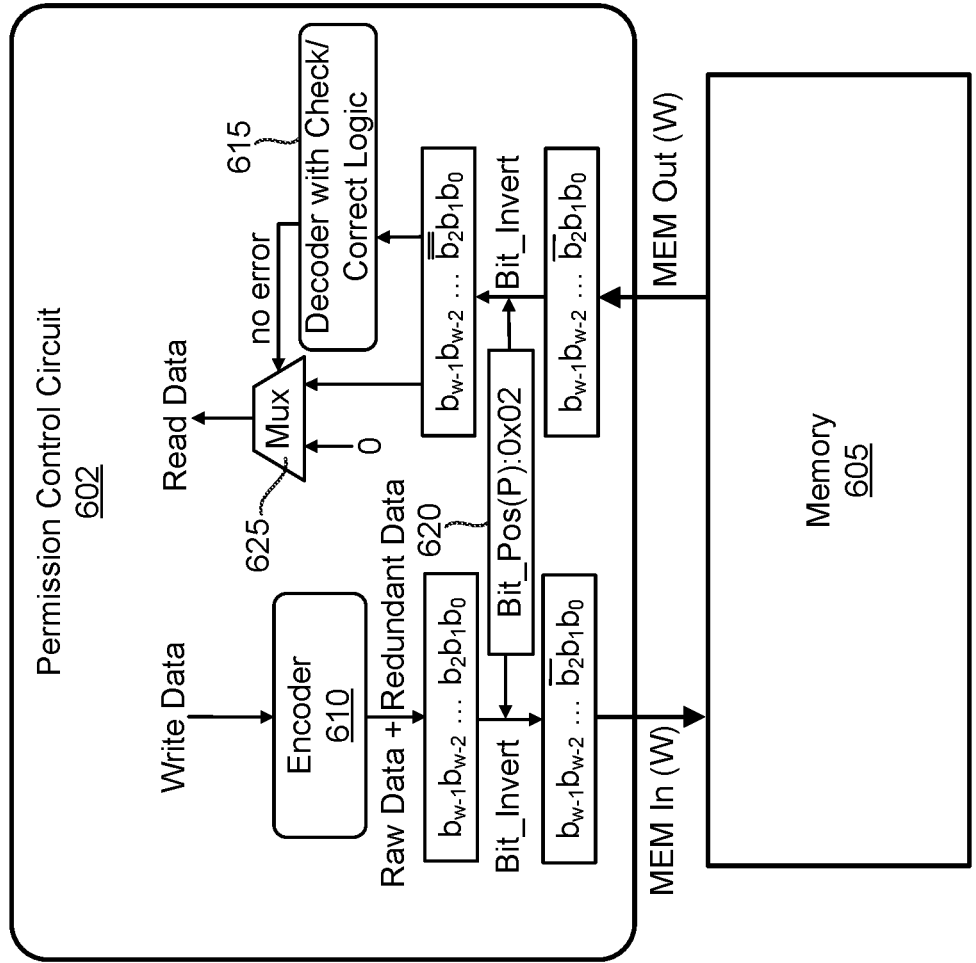
FIG. 6A illustrates an example authorized memory access using permission control via data redundancy, in accordance with some embodiments.

FIG. 6A illustrates an example 600 of an authorized memory access using permission control via data redundancy, in accordance with some embodiments. The authorized memory access 600 may be performed while accessing a memory 605 via a permission control circuit 602. The memory 605 may be an embodiment of the memory 520, and the permission control circuit 602 can be an embodiment of the permission control circuit 515. The permission control circuit 602 includes an encoder 610, a decoder 615 with a check/correct logic, a bit position register 620, and an output multiplexer 625. The authorized memory access 600 can be performed when applying, e.g., a single-error correcting (SEC) and double-error detecting (DED) redundancy code, or SECDED redundancy code.

Data written into/read from the memory 605 may be denoted as a data vector, W={R[r−1:0], D[d−1:0]}, where R[r−1:0] is a redundant code of length r, and D[d−1:0] is raw data of length d. Thus, the total length of the data vector, W, is w=d+r. The i-th bit of the data vector, W, can be denoted as $b_i$ that can be either 0 or 1, i.e., $b_i \in \{0, 1\}$, for i=0, 1, . . . , w−1. On each memory write, the encoder 610 generates a protection code R (i.e., redundant data) for raw data D by applying, e.g., the SECDED redundancy code. For the authorized memory access 600, the encoder 610 applies the SECDED redundancy code to the raw data D={$b_{d-1}$ $b_{d-2}$ . . . $b_2 b_1 b_0$} to generate raw data with redundant data, i.e., the data vector, W={$b_{w-1} b_{w-2}$ . . . $b_2 b_1 b_0$}. Subsequently, one or more bits of the data vector, W, whose positions are indicated by the content of bit position register 620, may be inverted. Since the bit position indicated by the bit position register 620 is two (i.e., the value of bit position register 620 is 0x02), the bit $b_2$ is inverted, and the raw data with redundant data, i.e., the data vector W={$b_{w-1} b_{w-2}$ . . . $b_2 b_1 b_0$} becomes a protected data vector $W_p$={$b_{w-1} b_{w-2}$ . . . $\overline{b_2} b_1 b_0$}. The protected data vector $W_p$={$b_{w-1} b_{w-2}$ . . . $\overline{b_2} b_1 b_0$} is then written into the memory 605.

On each memory read, after the protected data vector, $W_p$, is read out of the memory 605, the one or more bits indicated by the bit position register 620 are re-inverted, resulting in a reconstituted data vector, $W_r$. As the bit position register 620 still encodes the second bit position (i.e., the value of bit position register 620 is still 0x02), the bit $b_2$ in the protected data vector, $W_p$, is re-inverted, and the protected data vector $W_p$={$b_{w-1} b_{w-2}$ . . . $\overline{b_2} b_1 b_0$} returns to its original form, W={$b_{w-1} b_{w-2}$ . . . $\overline{b_2} b_1 b_0$}, i.e., the reconstituted data vector $W_r$ is equivalent to the original data vector, W. The reconstituted data vector, $W_r$={$b_{w-1} b_{w-2}$ . . . $\overline{b_2} b_1 b_0$} may be passed through the check/correct logic of the decoder 615. Since $\overline{b_2}$=$b_2$, no error, correctable or otherwise, will be detected by the check/correct logic of the decoder 615 as a result of the aforementioned transformations, although an error could still be incurred as a result of faults. Given that no uncorrectable error is detected, the output multiplexer 625 selects the reconstituted data vector, $W_r$, which encodes the original raw data D as an output. This represents an authorized memory access where the content of bit position register 620 is constant between the write to the memory 605 and the read from the memory 605, indicating that the write to and the read from the memory 605 are from the same tenant. On the other hand, if the bit position register 620 were to be updated before the read from the memory 605, indicating the read from the memory 605 is originating from some other unauthorized tenant, the check/correct logic of the decoder 615 would detect an uncorrectable error and the output multiplexer 625 would then select all zeros as an output, thus effectively blocking the unauthorized memory access.

Figure 6B:
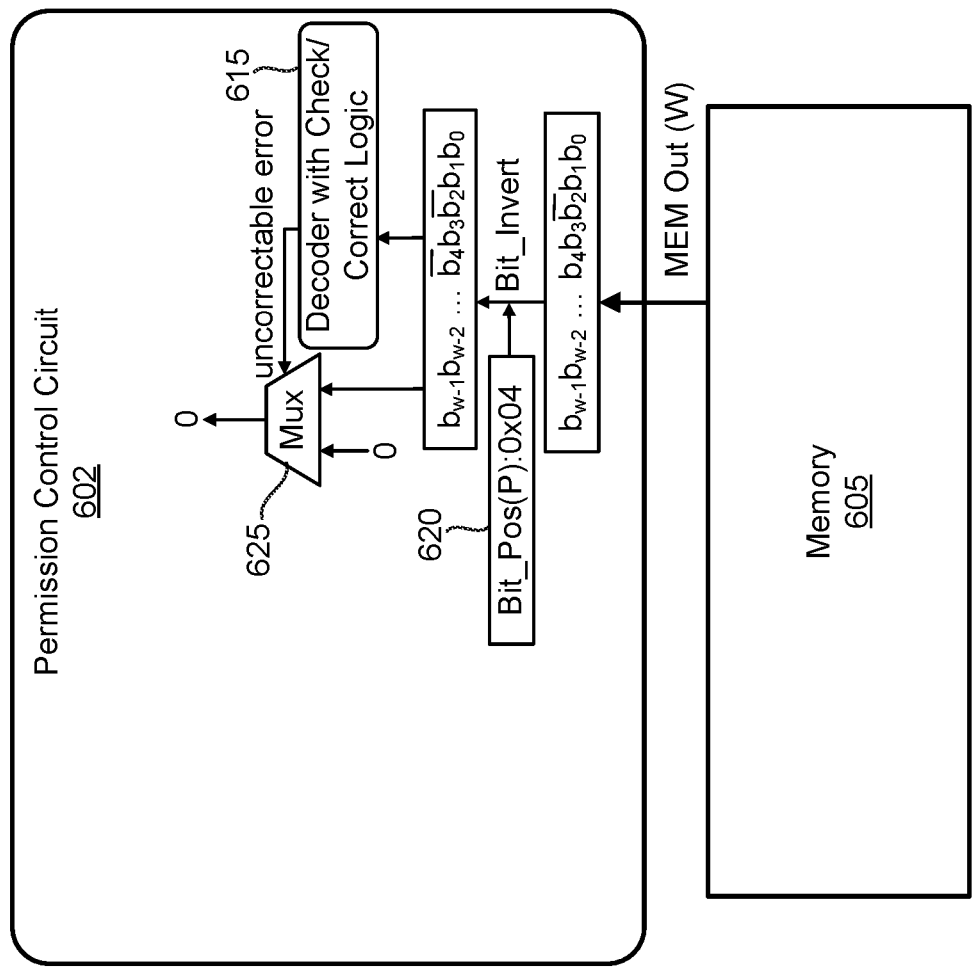
FIG. 6B illustrates an example unauthorized memory access using permission control via data redundancy, in accordance with some embodiments.

FIG. 6B illustrates an example 630 of an unauthorized memory access using permission control via data redundancy, in accordance with some embodiments. An unauthorized tenant attempts to access the protected data vector, $W_p$={$b_{w-1} b_{w-2}$ . . . $b_4 b_3 \overline{b_2} b_1 b_0$} that was previously written into the memory 605 by the authorized tenant, identified by the value of two encoded in the bit position register 620 (e.g., as shown in FIG. 6A). Before the read from the memory 605 is performed, content of the bit position register 620 is updated to the value of four when a new tenant is given control. In such case, the reconstituted data vector, $W_r$, has the value of {$b_{w-1} b_{w-2}$ . . . $\overline{b_4} b_3 \overline{b_2} b_1 b_0$}. In this scenario, when the reconstituted data vector, $W_r$, is presented to the decoder 615, an uncorrectable error will be detected, and the output multiplexer 625 will then block the read from the memory 605 for the unauthorized tenant and return all zeroes.

The bit position register 620 can encode the bit positions in many ways. In one embodiment, a single bit is used for each bit position of the data vector, W. In such case, the i-th bit in the bit position register 620 is set to 1 to indicate that the i-th bit in data vector, W, is selected to be inverted; otherwise, the i-th bit in the bit position register 620 is set to 0 to indicate that the i-th bit in the data vector, W, will not be inverted. As a result, the bit position register 620 has the same bit width as the data vector, W. The inverting of one or multiple bits in the data vector, W, can then be implemented by performing XOR operation between content of the bit position register 620 and the data vector, W.

The bit position register 620 may encode numbers of bit positions in the range [⌈(m+1)/2⌉, ⌊n/2⌋], where m is the number of erroneous bits that can be corrected, and n is the number of erroneous bits that can be detected. For SECDED codes, m=1 and n=2, and [⌈(m+1)/2⌉, ⌊n/2⌋]={1}. Therefore, all legal bit position lists for the bit position register 620 may, for example, only consist of a single bit position. For Double Error Correction and Triple Errors Detection (DECTED) codes, m=2, n=3, and [⌈(m+1)/2⌉, ⌊n/2⌋]=∅. Thus, for the DECTED codes, there is no legal bit position list for the bit position register 620. Therefore, the method for permission control via data redundancy presented herein may be applied with error correction codes that contain at least one even number in the range of (m, n].

The bit position register 620 may be allowed to choose bit positions from a legal set U={$u_i$}, where each element is a list of bit positions that satisfies the following three constraints: (1) any bit position x in a list $u_i$ is a valid bit position for a data vector, W, i.e., x∈[0,w); (2) each list $u_i$ should contain a number of bit positions in the range of [⌈(m+1)/2⌉, ⌊n/2⌋], i.e., $u_i$∈[⌈(m+1)/2⌉, ⌊n/2⌋]; (3) any two different lists in the set U should have empty intersection, i.e., $u_i \cap u_j$=∅ for any i, j, where i≠j, $u_i$∈U and $u_j$∈U. For the SECDEC codes, the following holds: U={$u_i$={i}|i∈[0,w)}. Thus, for the SECDEC codes, the legal set U contains w lists numbered from 0 to (w−1), each list containing exactly one bit position equal to its number.

Each list in the legal set U can be used by the bit position register 620 only once, i.e., for only one user (or tenant). Whenever the bit position register 620 is updated (e.g., when other user/tenant is accessing the memory 605), all contents that were stored in the memory 605 would become inaccessible instantly, because these contents were written with stale bit position sets. If a read tries to access data that was not written with the new value of the bit position register 620, x∈ (m, n] bits would be inverted in the data presented to the decoder 615 with the check/correct logic, and an uncorrectable error would be triggered. The output multiplexer 625 would swap the read data with zeros, effectively preventing the data from being read out by a different user/tenant (or at context switching).

For encoding using SECDED codes, if there is a single bit error, the check/correct logic in the decoder 615 can detect a position of an error bit and correct the error bit. If there are two bit errors, the check/correct logic in the decoder 615 detects the presence of two bit errors, but the check/correct logic in the decoder 615 cannot decide which two bits are inverted. If there are more than two bit errors, the check/correct logic in the decoder 615 may flag a multi-bit-error in the data or can assert there is no error at all.

For encoding using SECDED codes, both memory read and memory write use the bit position register 620 to invert one bit in the data vector, W. If content of the bit position register 620 does not change for the read and write operations to the same location in the memory 605, the same bit would be inverted twice, and the data vector may be recovered to its original value.

On changing of a user that will access the memory 605 (or on context switching), content of the bit position register 620 is updated using a new list from the legal set U. As a result, all reads to locations in the memory 605 that were written by previous users (or contexts) would result in a different bit being inverted, unless a new content of the bit position register 620 is used to write data to the memory 605.

For encoding using SECDED codes, after reset, content of the bit position register 620 can be set to the bit position 0. A write to the address 0x100 in the memory 605 would have bit 0 inverted and stored in the memory 605. If the same user reads the memory address 0x100, the bit indicated by the content of the bit position register 620 would be inverted, which is a bit at the position 0. When switching to a new user, content of the bit position register 620 is updated to a new bit position, e.g., a bit position 1. The new user cannot read out the data stored in the memory address 0x100 by the previous user as any read from the new user would now invert a bit at the bit position 1, which the previous user wrote to the memory address 0x100 with a bit at the bit position 0 inverted. As a result, if the new user attempts to read the memory address 0x100 without writing to the memory address 0x100 first, the data read out would have both bits at bit positions 0 and bit 1 inverted. In such case, the check/correct logic in the decoder 615 would flag a two-bit error, which is uncorrectable. If the new user writes to the memory address 0x100 with the new value of the bit position register 620, the data stored in the memory address 0x100 would have only one bit at the bit position 1 inverted, which can be read out correctly.

When the bit position register 620 exhausts the legal set U, a physical memory array clearing can be carried out before the bit position register 620 can be reset. In one embodiment, the physical memory array clearing can be achieved by writing zeros to each memory entry. Although physical memory array clearing is still unavoidable, the proposed scheme reduces a frequency of physical memory array clearing by a considerable number. For example, for w=137, m=1 and n=2, the frequency of physical memory array clearing can be reduced by 137 times. This allows the cost of physical memory array clearing to be amortized substantially.

In the case of the presence of transient bit errors in data read from the memory 605, under authorized access scenarios, if the number of bit errors is no larger than n, the decoder 615 with the check/correct logic would detect/correct the error as designed. In unauthorized scenarios, the $x \in (m, n]$ intentionally induced bit-errors plus the random bit errors can exceed the number n or become less or equal to m. As a result, the decoder 615 with the check/correct logic may not detect such an error, and the unauthorized access could go undetected.

Figure 6C:
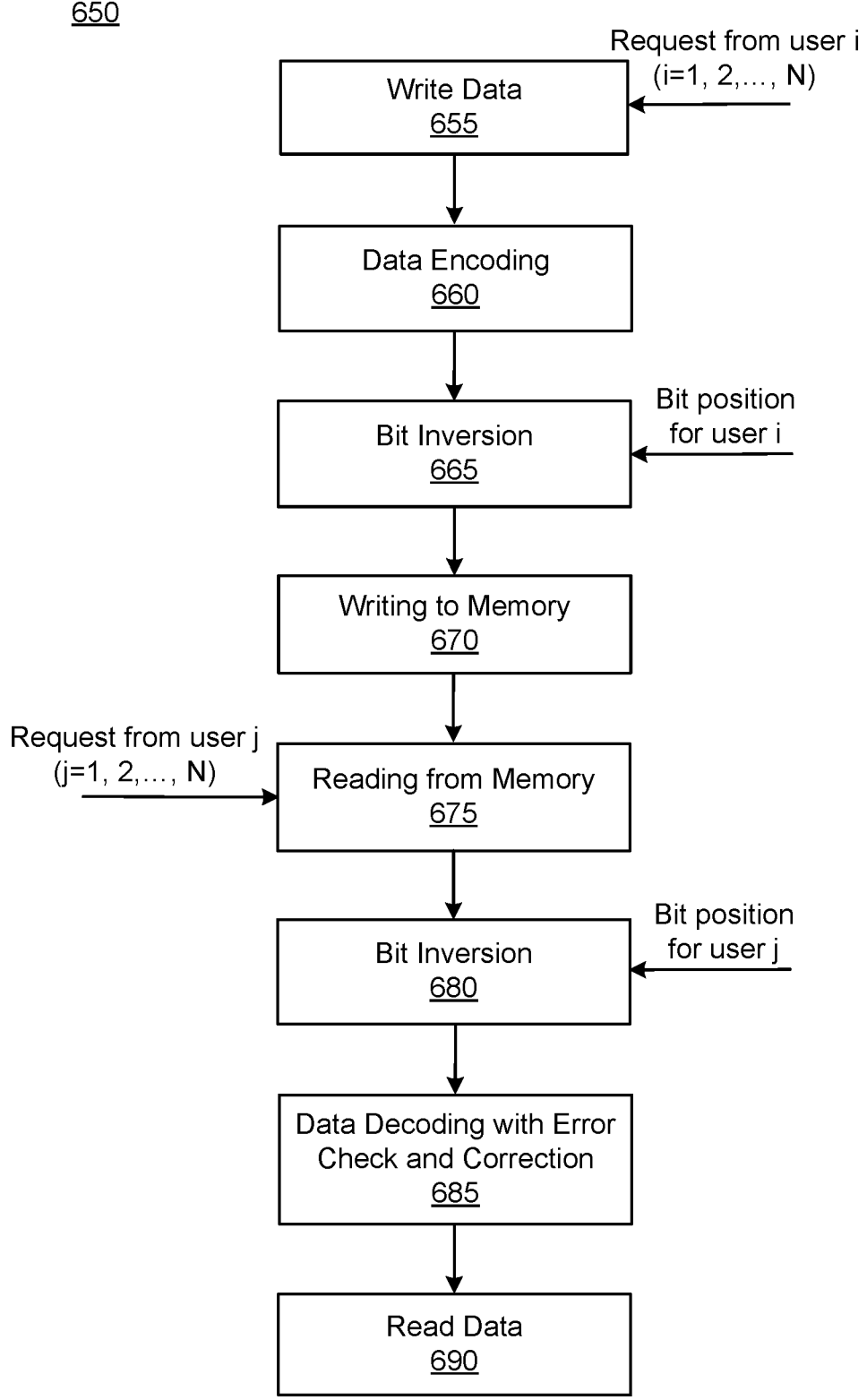
FIG. 6C is a flowchart illustrating operations for memory access using permission control via data redundancy, in accordance with some embodiments.

FIG. 6C is a flowchart 650 illustrating operations for memory access using permission control via data redundancy, in accordance with some embodiments. At 655, write data is ready to be written to the memory 605, based on a request from a user i (i=1, N). At 660, data encoding is performed by the encoder 610 to generate the raw data with redundant data. At 665, bit inversion is applied to the raw data with redundant data (i.e., data vector, W) to invert a bit at a bit position dedicated for the user i (i.e., determined by content of the bit position register 620 for the user i). The bit inversion at 665 produces a protected data vector, $W_p$. At 670, the protected data vector, $W_p$, is written into the memory 605.

At 675, upon a request from a user j (j=1, N), the protected data vector, $W_p$, is read from the memory 605. At 680, bit inversion is applied to the protected data vector, $W_p$, read from the memory 605 to invert a bit at a bit position dedicated for the user j (i.e., determined by content of the bit position register 620 for the user j). The bit inversion at 680 produces a reconstituted data vector, $W_r$. In one embodiment, the user j is the same as the user i (i.e., i=j), and thus the user j is the authorized user for accessing the protected data vector, $W_p$, from the memory 605. In such case, the bit position for the user j corresponds to the bit position for the user i, and the same bit that was inverted at 665 is also inverted at 680, and the reconstituted data vector, $W_r$ is equivalent to the data vector, W. Thus, at 685, data decoding is performed at the decoder 615, and the check/correct logic asserts that no error has been made. Finally, at 690, read data is output by the multiplexer 625, and the output data corresponds to the original write data at 655.

In another embodiment, the user j is different from the user i (i.e., i≠j), and thus the user j is an unauthorized user not being allowed to access the data vector W from the memory 605. In such case, the bit position for the user j is different from the bit position for the user i as content of the bit position register 620 has been updated going from the user i to the user j. Thus, at 680, a bit of the data vector W is inverted that is different from the bit inverted d at 665. Because of that, the reconstituted data vector produced by bit inversion at 680 has two bits inverted relative to the original raw data with redundant data produced at 660. For encoding using SECDED codes, at 685, the check/correct logic of the decoder 615 is only able to assert that an error occurred, but the check/correct logic of the decoder 615 is not able to correct two erroneous bits. Therefore, at 690, read data is output by the multiplexer 625 as all zeroes, and the unauthorized user j is not able to access the original data written to the memory 605 by the other user i.

Example Process Flows

Figure 7A:
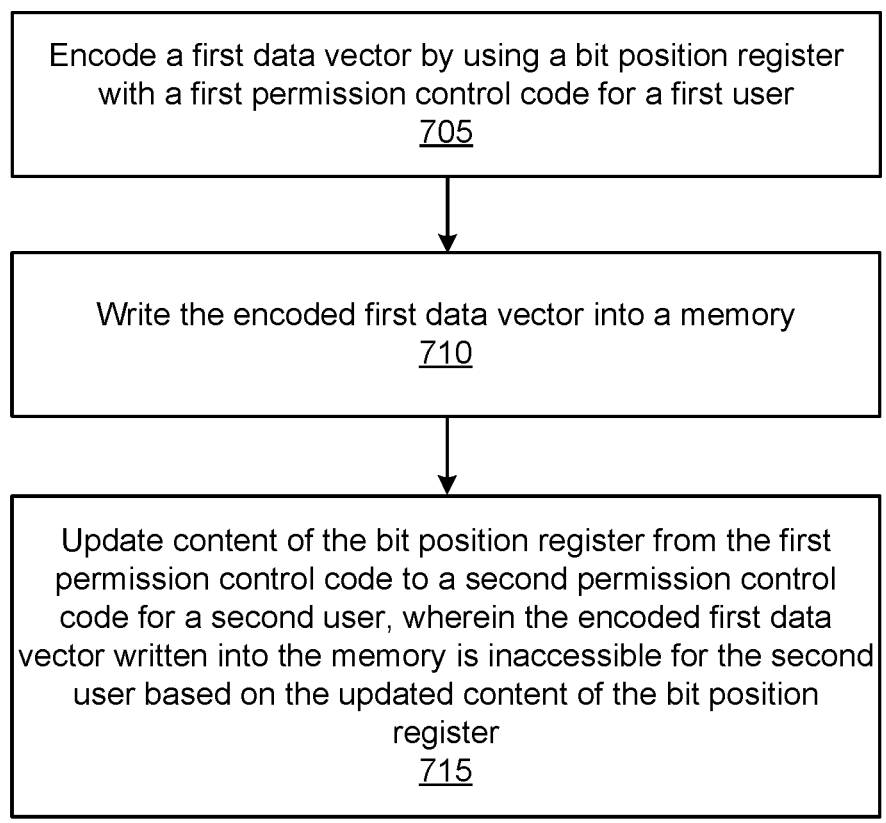
FIG. 7A is a flowchart illustrating an example method for writing data into a memory using permission control via data redundancy, in accordance with some embodiments.

FIG. 7A is a flowchart illustrating an example method 700 for writing data into a memory using permission control via data redundancy, in accordance with some embodiments. The operations of method 700 may be performed at one or more deterministic streaming processors (e.g., one or more TSP chips or cards). The one or more deterministic streaming processors may be deployed in a computing system such as a deterministic streaming system that can further include a permission control circuit, a compiler running on at least one computer processor, and a non-transitory computer-readable storage medium (i.e., a memory) for storing computer executable instructions and data. Each deterministic streaming processor of the computing system can be an embodiment of the TSP 200 or an embodiment of the TSP 400.

The operations of method 700 may be initiated by the compiler operating on at least one computer processor and/or on a host server integrated into the computing system or separate from the computing system. The compiler may utilize as its input a model (e.g., a machine learning model) for the one or more deterministic streaming processors and outputs instructions for configuring operation of the one or more deterministic streaming processors and the computing system as a whole.

The computing system encodes 705 (e.g., via the permission control circuit) a first data vector by using a bit position register with a first permission control code for a first user. The computing system writes 710 (e.g., via the permission control circuit) the encoded first data vector into the memory. The computing system updates 715 (e.g., via the permission control circuit) content of the bit position register from the first permission control code to a second permission control code for a second user. The encoded first data vector written into the memory is inaccessible for the second user based on the updated content of the bit position register.

The encoded first data vector written into the memory is only accessible by the first user prior to updating the content of the bit position register. The first permission control code indicates a position of a bit in the first data vector to be inverted when generating the encoded first data vector. The permission control circuit may be integrated into a single deterministic streaming processor of one or more deterministic streaming processors in the computing system. Alternatively, the permission control circuit may be shared by a plurality of deterministic streaming processors in the computing system.

The computing system may encode (e.g., via the permission control circuit) a second data vector by using the bit position register with the second permission control code, and write (e.g., via the permission control circuit) the encoded second data vector into the memory. The encoded second data vector written into the memory is inaccessible for the first user and is accessible only for the second user based on the updated content of the bit position register. The computing system may encode (e.g., via the permission control circuit) the first data vector by inverting a bit in the first data vector in accordance with the first permission control code. The computing system may encode (e.g., via the permission control circuit) the first data vector by further using a single-error correcting and double-error detecting code (SECDED).

Figure 7B:
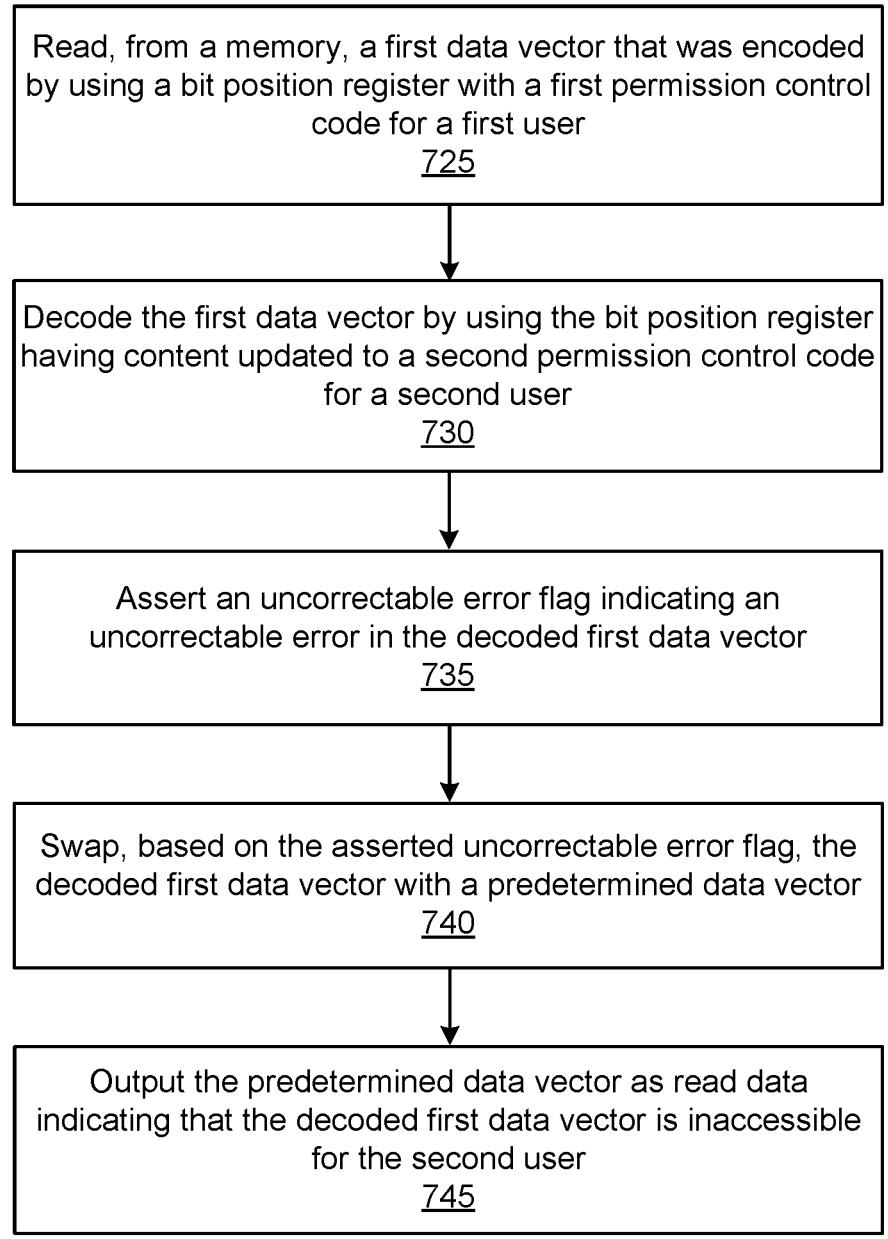
FIG. 7B is a flowchart illustrating an example method for reading data from a memory using permission control via data redundancy, in accordance with some embodiments.

FIG. 7B is a flowchart illustrating an example method 720 for reading data from a memory using permission control via data redundancy, in accordance with some embodiments. The operations of method 720 can be performed at one or more deterministic streaming processors (e.g., one or more TSP chips or cards). The one or more deterministic streaming processors may be deployed in a computing system such as a deterministic streaming system that can further include a permission control circuit, a compiler running on at least one computer processor, and a non-transitory computer-readable storage medium (i.e., a memory) for storing computer executable instructions and data. Each deterministic streaming processor of the computing system can be an embodiment of the TSP 200 or an embodiment of the TSP 400.

The operations of method 720 may be initiated by the compiler operating on at least one computer processor and/or on a host server integrated into the computing system or separate from the computing system. The compiler may utilize as its input a model (e.g., a machine learning model) for the one or more deterministic streaming processors and outputs instructions for configuring operation of the one or more deterministic streaming processors and the computing system as a whole.

The computing system reads 725 from the memory (e.g., via the permission control circuit) a first data vector that was encoded by using a bit position register with a first permission control code for a first user. The computing system decodes 730 (e.g., via the permission control circuit) the first data vector by using the bit position register having content updated to a second permission control code for a second user. The computing system asserts 735 (e.g., via the permission control circuit) an uncorrectable error flag indicating an uncorrectable error in the decoded first data vector. The computing system swaps 740 (e.g., via the permission control circuit) the decoded first data vector with a predetermined data vector, based on the asserted uncorrectable error flag. The computing system outputs 745 (e.g., via the permission control circuit) the predetermined data vector as read data indicating that the decoded first data vector is inaccessible for the second user.

The computing system may decode (e.g., via the permission control circuit) the first data vector by using the first permission control code for the first user, prior to updating the content of the bit position register. The computing system may assert (e.g., via the permission control circuit) a no-error flag indicating no error in the decoded the first data vector, and output (e.g., via the permission control circuit), based on the asserted no-error flag, the decoded first data vector as read data requested by the first user. The first permission control code indicates a first position of a first bit in the first data vector inverted when encoding the first data vector before writing the encoded first data vector into the memory, and the second permission control code indicates a second position of a second bit in the first data vector read from the memory to be inverted when decoding the first data vector. The computing system may decode (e.g., via the permission control circuit) the first data vector by inverting a bit in the first data vector read from the memory in accordance with the second permission control code.

Example Computer System Architecture

Figure 8A:
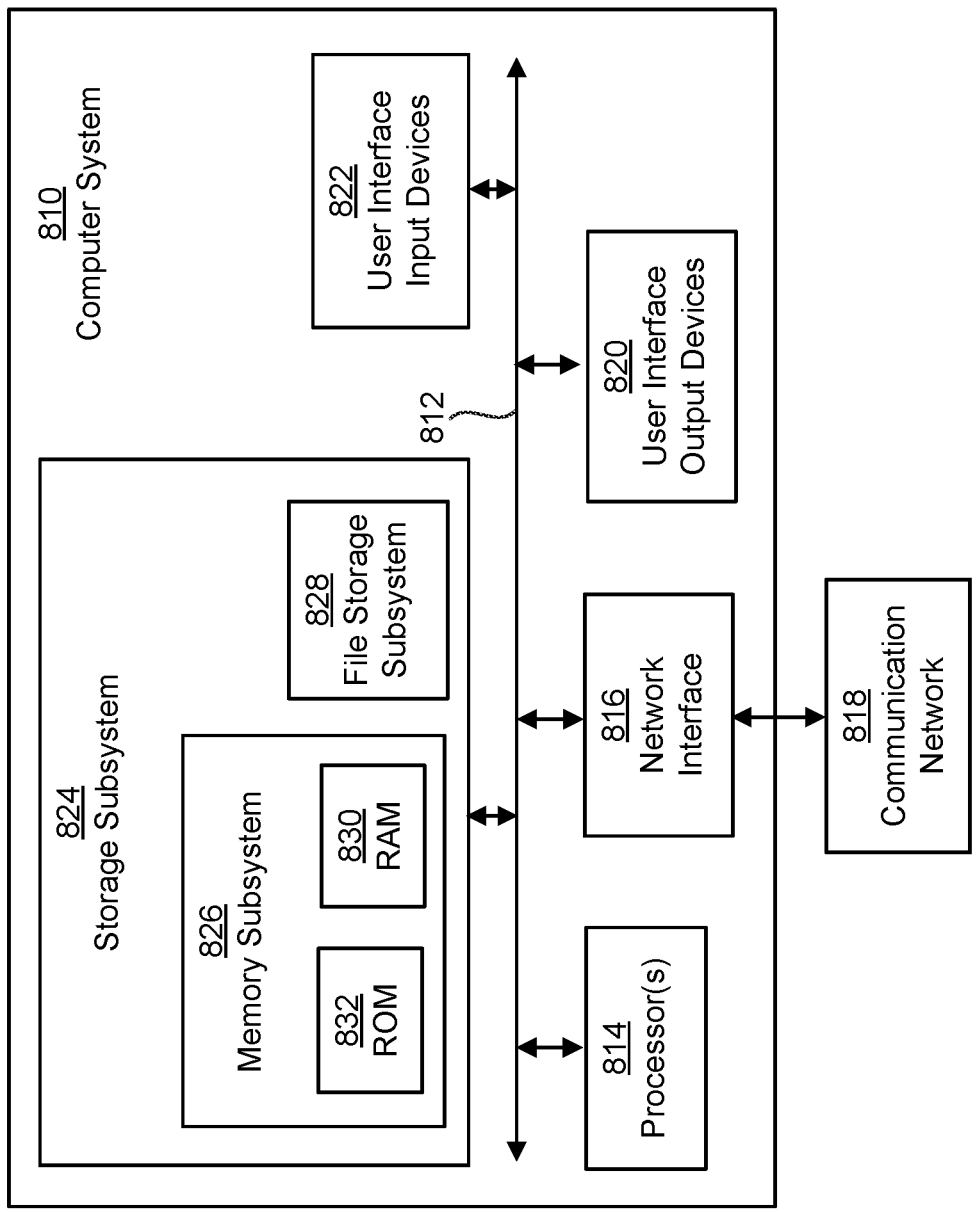
FIG. 8A is an example abstract diagram of a computer system suitable for enabling embodiments of the claimed disclosures for use in commerce, in accordance with some embodiments.

FIG. 8A is an abstract diagram of an example computer system suitable for enabling embodiments of the claimed disclosures, in accordance with some embodiments. In some embodiments described herein, a host processor comprises the computer system of FIG. 8A.

In FIG. 8A, the structure of computer system 810 typically includes multiple processors 814 which communicates with peripheral devices via bus subsystem 812. The deterministic streaming system 500 with the permission control can be an embodiment of the computer system 810, and each deterministic streaming processor 505 can be an embodiment of a respective processor 814. Typically, the computer includes a processor (e.g., a microprocessor, graphics processing unit, or digital signal processor), or its electronic processing equivalents, such as an ASIC or FPGA. Typically, peripheral devices include a storage subsystem 824, comprising a memory subsystem 826 and a file storage subsystem 828, user interface input devices 822, user interface output devices 820, and/or a network interface subsystem 816. The memory 520 or the memory 605 can be an embodiment of the memory subsystem 826. The input and output devices enable direct and remote user interaction with computer system 810. The computer system enables significant post-process activity using at least one output device and/or the network interface subsystem.

The computer system can be structured as a server, a client, a workstation, a mainframe, a personal computer (PC), a tablet PC, a set-top box (STB), a personal digital assistant (PDA), a cellular telephone, a smartphone, a web appliance, a rack-mounted 'blade', a kiosk, a television, a game station, a network router, switch or bridge, or any data processing machine with instructions that specify actions to be taken by that machine. The term 'server', as used herein, refers to a computer or processor that typically performs processes for, and sends data and information to, another computer or processor.

A computer system typically is structured, in part, with at least one operating system program, for example, MICROSOFT WINDOWS, APPLE MACOS and IOS, GOOGLE ANDROID, Linux and/or Unix. The computer system typically includes a Basic Input/Output System (BIOS) and processor firmware. The operating system, BIOS and firmware are used by the processor to structure and control any subsystems and interfaces connected to the processor. Example processors that enable these operating systems include: the Pentium, Itanium, and Xeon processors from INTEL; the Opteron and Athlon processors from AMD (ADVANCED MICRO DEVICES); the Graviton processor from AMAZON; the POWER processor from IBM; the SPARC processor from ORACLE; and the ARM processor from ARM Holdings.

Any embodiment of the present disclosure is limited neither to an electronic digital logic computer structured with programs nor to an electronically programmable device. For example, the claimed embodiments can use an optical computer, a quantum computer, an analog computer, or the like. Further, where only a single computer system or a single machine is signified, the use of a singular form of such terms also can signify any structure of computer systems or machines that individually or jointly use processes. Due to the ever-changing nature of computers and networks, the description of computer system 810 depicted in FIG. 8A is intended only as an example. Many other structures of computer system 810 have more components than the computer system depicted in FIG. 8A.

Network interface subsystem 816 provides an interface to outside networks, including an interface to communication network 818, and is coupled via communication network 818 to corresponding interface devices in other computer systems or machines. Communication network 818 can comprise many interconnected computer systems, machines and physical communication connections (signified by 'links'). These communication links can be wireline links, optical links, wireless links (e.g., using the WiFi or Bluetooth protocols), or any other physical devices for communication of information. Communication network 818 can be any suitable computer network, for example a wide area network such as the Internet, and/or a local-to-wide area network such as Ethernet. The communication network is wired and/or wireless, and many communication networks use encryption and decryption processes, such as is available with a virtual private network. The communication network uses one or more communications interfaces, which receive data from, and transmit data to, other systems. Embodiments of communications interfaces typically include an Ethernet card, a modem (e.g., telephone, satellite, cable, or Integrated Services Digital Network (ISDN)), (asynchronous) digital subscriber line (DSL) unit, Firewire interface, universal serial bus (USB) interface, and the like. Communication algorithms ('protocols') can be specified using one or communication languages, such as Hypertext Transfer Protocol (HTTP), Transmission Control Protocol/Internet Protocol (TCP/IP), Real-time Transport Protocol/Real Time Streaming Protocol (RTP/RTSP), Internetwork Packet Exchange (IPX) protocol and/or User Datagram Protocol (UDP).

User interface input devices 822 can include an alphanumeric keyboard, a keypad, pointing devices such as a mouse, trackball, toggle switch, touchpad, stylus, a graphics tablet, an optical scanner such as a bar code reader, touchscreen electronics for a display device, audio input devices such as voice recognition systems or microphones, eye-gaze recognition, brainwave pattern recognition, optical character recognition systems, and other types of input devices. Such devices are connected by wire or wirelessly to a computer system. Typically, the term 'input device' signifies all possible types of devices and processes to transfer data and information into computer system 810 or onto communication network 818. User interface input devices typically enable a user to select objects, icons, text and the like that appear on some types of user interface output devices, for example, a display subsystem.

User interface output devices 820 can include a display subsystem, a printer, a fax machine, or a non-visual communication device such as audio and haptic devices. The display subsystem can include a CRT, a flat-panel device such as an LCD, an image projection device, or some other device for creating visible stimuli such as a virtual reality system. The display subsystem can also provide non-visual stimuli such as via audio output, aroma generation, or tactile/haptic output (e.g., vibrations and forces) devices. Typically, the term 'output device' signifies all possible types of devices and processes to transfer data and information out of computer system 810 to the user or to another machine or computer system. Such devices are connected by wire or wirelessly to a computer system. Note that some devices transfer data and information both into and out of the computer, for example, haptic devices that generate vibrations and forces on the hand of a user while also incorporating sensors to measure the location and movement of the hand. Technical applications of the sciences of ergonomics and semiotics are used to improve the efficiency of user interactions with any processes and computers disclosed herein, such as any interactions with regards to the design and manufacture of circuits that use any of the above input or output devices.

Memory subsystem 826 typically includes several memories including a main RAM 830 (or other volatile storage device) for storage of instructions and data during program execution and a ROM 832 in which fixed instructions are stored. File storage subsystem 828 provides persistent storage for program and data files, and can include a hard disk drive, a floppy disk drive along with associated removable media, a CD-ROM drive, an optical drive, a flash memory such as a USB drive, or removable media cartridges. If computer system 810 includes an input device that performs optical character recognition, then text and symbols printed on a physical object (such as paper) can be used as a device for storage of program and data files. The databases and modules used by some embodiments can be stored by file storage subsystem 828.

Bus subsystem 812 provides a device for transmitting data and information between the various components and subsystems of computer system 810. Although bus subsystem 812 is depicted as a single bus, alternative embodiments of the bus subsystem can use multiple buses. For example, a main memory using RAM can communicate directly with file storage systems using DMA systems.

Figure 8B:
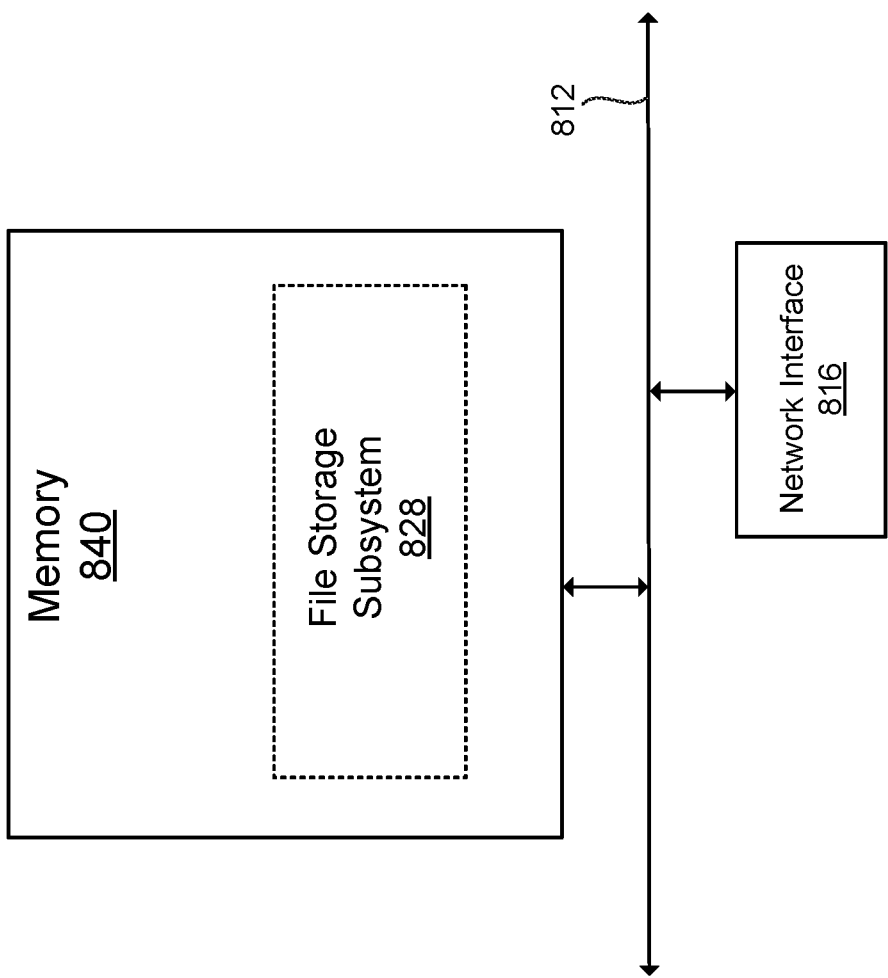
FIG. 8B is another abstract diagram of a computer system suitable for enabling embodiments of the claimed disclosures for use in commerce, in accordance with some embodiments.

FIG. 8B is another abstract diagram of a computer system suitable for enabling embodiments of the claimed disclosures, in accordance with some embodiments. In some embodiments described herein, a host processor comprises the computer system of FIG. 8B.

FIG. 8B depicts a memory 840 such as a non-transitory, processor readable data and information storage medium associated with file storage subsystem 828, and/or with network interface subsystem 816 (e.g., via bus subsystem 812), and can include a data structure specifying a circuit design. The memory 840 can be a hard disk, a floppy disk, a CD-ROM, an optical medium, removable media cartridge, or any other medium that stores computer readable data in a volatile or non-volatile form, such as text and symbols on a physical object (such as paper) that can be processed by an optical character recognition system. A program transferred into and out of a processor from such a memory can be transformed into a physical signal that is propagated through a medium (such as a network, connector, wire, or circuit trace as an electrical pulse); or through a medium such as space or an atmosphere as an acoustic signal, or as electromagnetic radiation with wavelengths in the electromagnetic spectrum longer than infrared light).

One skilled in the art will recognize that any of the computer systems illustrated in FIGS. 8A-8B comprises a machine for performing a process that achieves an intended result by managing work performed by controlled electron movement.

Additional Example Computing System

Figure 9:
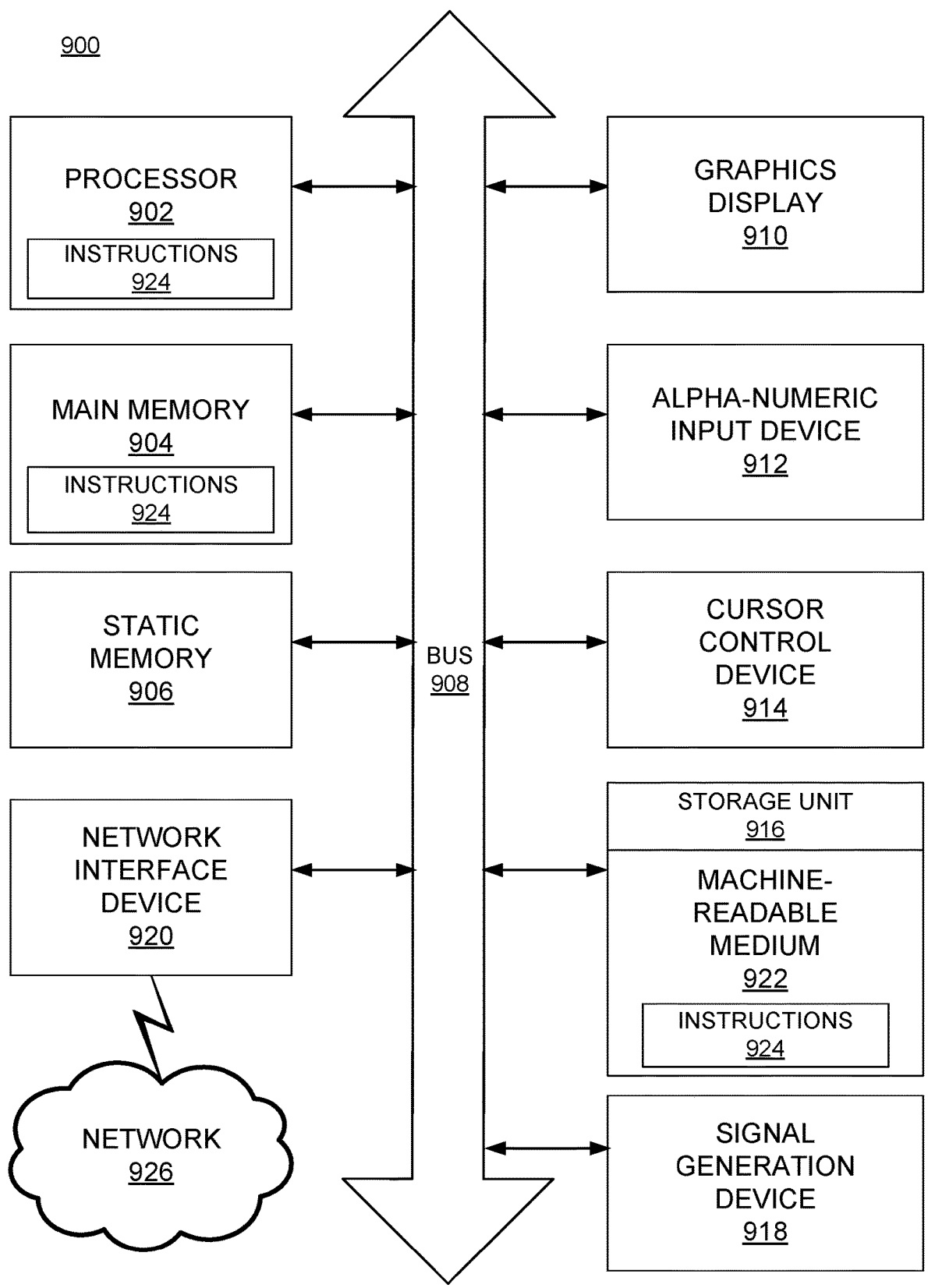
FIG. 9 illustrates a computing machine for use in commerce, in accordance with some embodiments.

FIG. 9 is a block diagram illustrating components of an example computing machine that is capable of reading instructions from a computer-readable medium and executing them in a processor (or controller) according to an embodiment. A computer described herein includes a single computing machine shown in FIG. 9, a virtual machine, a distributed computing system that includes multiple nodes of computing machines shown in FIG. 9, or any other suitable arrangement of computing devices. The computer described herein can be used by any of the elements described in the previous figures to execute the described functions.

By way of example, FIG. 9 depicts a diagrammatic representation of a computing machine in the example form of a computer system 900 within which instructions 924 (e.g., software, program code, or machine code), which can be stored in a computer-readable medium, causing the machine to perform any one or more of the processes discussed herein. In some embodiments, the computing machine operates as a standalone device or is connected (e.g., networked) to other machines. In a networked deployment, the machine operates in the capacity of a server machine or a client machine in a server-client network environment, or as a peer machine in a peer-to-peer (or distributed) network environment.

The structure of a computing machine described in FIG. 9 corresponds to any software, hardware, or combined components shown in the figures above. By way of example, a computing machine is a tensor streaming processor designed and manufactured by GROQ, INC. of Mountain View, California, a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 924 that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes one or more processors (generally, a processor 902) (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 904, and a static memory 906, which are configured to communicate with each other via a bus 908. The computer system 900 further includes graphics display unit 910 (e.g., a plasma display panel (PDP), a liquid crystal display (LCD), a projector, or a cathode ray tube (CRT)). The computer system 900 can also include alphanumeric input device 912 (e.g., a keyboard), a cursor control device 914 (e.g., a mouse, a trackball, a joystick, a motion sensor, or other pointing instrument), a storage unit 916, a signal generation device 918 (e.g., a speaker), and a network interface device 920, which also are configured to communicate via the bus 908.

The storage unit 916 includes a computer-readable medium 922 on which the instructions 924 are stored embodying any one or more of the methodologies or functions described herein. The instructions 924 can also reside, completely or at least partially, within the main memory 904 or within the processor 902 (e.g., within a processor's cache memory). Thus, during execution thereof by the computer system 900, the main memory 904 and the processor 902 can also constitute computer-readable media. The instructions 924 can be transmitted or received over a network 926 via the network interface device 920.

While the computer-readable medium 922 is shown in an example embodiment to be a single medium, the term "computer-readable medium" should be taken to include a single medium or multiple media (e.g., a centralized or distributed database, or associated caches and servers) able to store instructions (e.g., the instructions 924). The computer-readable medium 922 includes any medium that is capable of storing instructions (e.g., the instructions 924) for execution by the machine and that cause the machine to perform any one or more of the methodologies disclosed herein. The computer-readable medium 922 can include, but not be limited to, data repositories in the form of solid-state memories, optical media, and magnetic media. The computer-readable medium 922 does not include a transitory medium such as a signal or a carrier wave.

Additional Considerations

The disclosed configurations have benefits and advantages that include, for example, a more efficient data flow by separating the functions of the processor into specialized functional units, and configuring the timing of data and instructions to each functional unit, such that each unit is able operate on received data based upon a known timing between received data and instructions. Because the compiler for the processor is hardware aware, it is able to configure an explicit plan for the processor indicating how and when instructions and data operands are transmitted to different tiles of the processor. By accounting for the timing of received instructions and data, the data can be transmitted between the tiles of the processor without unnecessary metadata, increasing the efficiency of the transmission. In addition, by separating the transmission of data and instructions, instructions can be iterated and looped independent of received data operands.

In addition, because each computational element of the processor is dedicated to a specific function (e.g., MEM, VXM, MXM, SXM), the amount of instructions needed to be processed by the computational elements can be reduced. For example, certain computational elements (e.g., in MXM functional slice) can be configured to perform a limited set of operations on any received data. As such, these computational elements can operate without having to receive explicit instructions or only receiving intermittent or limited instructions, potentially simplifying operation of the processor. For example, data operands read from memory can be intercepted by multiple functional slices as the data is transmitted across a data lane, allowing for multiple operations to be performed on the data in a more efficient manner.

In operation, a host computer programs a DMA engine to actually transfer data, again all of which is coordinated by the runtime layer. Specifically, the IDU transfers 320-byte vectors from PCIe-Gen4 32-bytes every core-clock cycle (e.g., nominal 900 Mhz). Thus, the 320-element vector arrives over a period of 10 cycles and placed on multiple streams moving towards the MEM. The incoming streams flow on S24-31 (upper eight streams), from which the MEM performs a "write" to commit that vector to SRAM. Hence, a PCI-Receive consists of (i) receiving the data from the PCI interface, and (ii) writing the vector into the specified functional slice of the MEM.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules can be embodied in software, firmware, hardware, or any combinations thereof.

Any of the steps, operations, or processes described herein can be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure can also relate to an apparatus for performing the operations herein. This apparatus can be specially constructed for the required purposes, and/or it can comprise a general-purpose computing device selectively activated or reconfigured by a computer program stored in the computer. Such a computer program can be stored in a non-transitory, tangible computer readable storage medium, or any type of media suitable for storing electronic instructions, which is coupled to a computer system bus. Furthermore, any computing systems referred to in the specification can include a single processor or can be architectures employing multiple processor designs for increased computing capability.

Some embodiments of the present disclosure can further relate to a system comprising a processor (e.g., a tensor streaming processor or an artificial intelligence processor), at least one computer processor (e.g., a host server), and a non-transitory computer-readable storage medium. The storage medium can store computer executable instructions, which when executed by the compiler operating on the at least one computer processor, cause the at least one computer processor to be operable for performing the operations and techniques described herein.

Finally, the language used in the specification has been principally selected for readability and instructional purposes, and it has not been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A computing system comprising:
    a memory; and
    a permission control circuit coupled to the memory, the permission control circuit configured to:
        encode a first data vector by using a bit position register with a first permission control code for a first user,
        write the encoded first data vector into the memory, and
        update content of the bit position register from the first permission control code to a second permission control code for a second user,
    wherein the encoded first data vector written into the memory is inaccessible for the second user based on the updated content of the bit position register.

2. The computing system of claim 1, wherein the encoded first data vector written into the memory is only accessible by the first user prior to updating the content of the bit position register.

3. The computing system of claim 1, wherein the permission control circuit is further configured to:
    encode a second data vector by using the bit position register with the second permission control code; and
    write the encoded second data vector into the memory, wherein the encoded second data vector written into the memory is inaccessible for the first user and is accessible only for the second user based on the updated content of the bit position register.

4. The computing system of claim 1, wherein the first permission control code indicates a position of a bit in the first data vector to be inverted when encoding the first data vector.

5. The computing system of claim 1, wherein the permission control circuit is further configured to:
    invert a bit in the first data vector in accordance with the first permission control code.

6. The computing system of claim 1, wherein the permission control circuit is further configured to:
    read the encoded first data vector from the memory;
    decode the first data vector read from the memory by using the bit position register with the second permission control code;
    assert an uncorrectable error flag indicating an uncorrectable error in the decoded first data vector;
    swap, based on the asserted uncorrectable error flag, the decoded first data vector with a predetermined data vector; and
    output the predetermined data vector as read data indicating that the decoded first data vector is inaccessible for the second user.

7. The computing system of claim 6, wherein:
    the first permission control code indicates a first position of a first bit in the first data vector inverted when encoding the first data vector before writing the encoded first data vector into the memory; and the second permission control code indicates a second position of a second bit in the first data vector read from the memory to be inverted when decoding the first data vector.

8. The computing system of claim 1, wherein the permission control circuit is further configured to:
read the encoded first data vector from the memory;
prior to updating the content of the bit position register, decode the first data vector by using the bit position register with the first permission control code for the first user;
assert a no-error flag indicating no error in the decoded the first data vector; and
output, based on the asserted no-error flag, the decoded first data vector as read data requested by the first user.

9. The computing system of claim 1, wherein the permission control circuit is further configured to:
decode the first data vector by inverting a bit in the first data vector read from the memory in accordance with the second permission control code.

10. The computing system of claim 1, wherein the permission control circuit is further configured to:
encode the first data vector by further using a single-error correcting and double-error detecting code (SECDED).

11. The computing system of claim 1, wherein the permission control circuit is integrated into a deterministic streaming processor of one or more deterministic streaming processors in the computing system.

12. The computing system of claim 1, wherein the permission control circuit is shared by a plurality of deterministic streaming processors in the computing system.

13. A method of writing data into a memory, the method comprising:
encoding a first data vector by using a bit position register with a first permission control code for a first user;
writing the encoded first data vector into the memory; and
updating content of the bit position register from the first permission control code to a second permission control code for a second user, wherein the encoded first data vector written into the memory is inaccessible for the second user based on the updated content of the bit position register.

14. The method of claim 13, wherein the encoded first data vector written into the memory is only accessible by the first user prior to updating the content of the bit position register.

15. The method of claim 13, further comprising:
encoding a second data vector by using the bit position register with the second permission control code; and
writing the encoded second data vector into the memory, wherein the encoded second data vector written into the memory is inaccessible for the first user and is accessible only for the second user based on the updated content of the bit position register.

16. The method of claim 13, further comprising:
encoding the first data vector by inverting a bit in the first data vector in accordance with the first permission control code.

17. A method of reading data from a memory, the method comprising:
reading, from the memory, a first data vector that was encoded by using a bit position register with a first permission control code for a first user;
decoding the first data vector by using the bit position register having content updated to a second permission control code for a second user;
asserting an uncorrectable error flag indicating an uncorrectable error in the decoded first data vector;
swapping, based on the asserted uncorrectable error flag, the decoded first data vector with a predetermined data vector; and
outputting the predetermined data vector as read data indicating that the decoded first data vector is inaccessible for the second user.

18. The method of claim 17, further comprising:
prior to updating the content of the bit position register, decoding the first data vector by using the first permission control code for the first user;
asserting a no-error flag indicating no error in the decoded the first data vector; and
outputting, based on the asserted no-error flag, the decoded first data vector as read data requested by the first user.

19. The method of claim 17, wherein:
the first permission control code indicates a first position of a first bit in the first data vector inverted when encoding the first data vector before writing the encoded first data vector into the memory; and
the second permission control code indicates a second position of a second bit in the first data vector read from the memory to be inverted when decoding the first data vector.

20. The method of claim 17, further comprising:
decoding the first data vector by inverting a bit in the first data vector read from the memory in accordance with the second permission control code.

* * * * *